(12) United States Patent
Fujihara

(10) Patent No.: US 8,089,702 B2
(45) Date of Patent: Jan. 3, 2012

(54) ZOOM LENS AND IMAGE PICKUP APPARATUS

(75) Inventor: Katsuya Fujihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 108 days.

(21) Appl. No.: 12/382,715

(22) Filed: Mar. 23, 2009

(65) Prior Publication Data

US 2009/0237805 A1    Sep. 24, 2009

(30) Foreign Application Priority Data

Mar. 24, 2008  (JP) ................................. 2008-075927

(51) Int. Cl.
G02B 15/14 (2006.01)
(52) U.S. Cl. ........................................ 359/687; 359/678
(58) Field of Classification Search .................. 359/687, 359/678
See application file for complete search history.

(56) References Cited

U.S. PATENT DOCUMENTS

| | | | | |
|---|---|---|---|---|
| 6,226,130 B1 * | 5/2001 | Mukaiya et al. | ............. | 359/687 |
| 7,113,346 B1 * | 9/2006 | Souma et al. | ................. | 359/687 |
| 7,515,352 B2 * | 4/2009 | Arai | ............................... | 359/687 |
| 7,616,386 B2 * | 11/2009 | Kimura | ......................... | 359/690 |
| 7,630,138 B2 * | 12/2009 | Ori | ................................. | 359/676 |
| 7,630,143 B2 * | 12/2009 | Sato | .............................. | 359/687 |
| 2009/0208195 A1 * | 8/2009 | Hatakeyama | ................... | 396/55 |

FOREIGN PATENT DOCUMENTS

| | | |
|---|---|---|
| JP | 08-248318 | 9/1996 |
| JP | 2000-131610 | 5/2000 |
| JP | 2003-202500 | 7/2003 |

* cited by examiner

*Primary Examiner* — Jordan Schwartz
(74) *Attorney, Agent, or Firm* — Rader, Fishman & Grauer PLLC

(57) ABSTRACT

A zoom lens includes first to fourth lens groups arranged in that order from the object side and having positive, negative, positive, and positive refractive powers. The first lens group includes a single first lens having a negative refractive power, a right-angle prism bending an optical path, and a second lens including at least a lens having a positive refractive power in that order from the object side. The second lens group includes a third lens including an aspherical surface and having a negative refractive power, a fourth lens having a negative refractive power, a fifth lens having a positive refractive power, and a sixth lens having a negative refractive power in that order from the object side. The second and fourth lens groups are moved in an optical-axis direction during zooming.

20 Claims, 17 Drawing Sheets

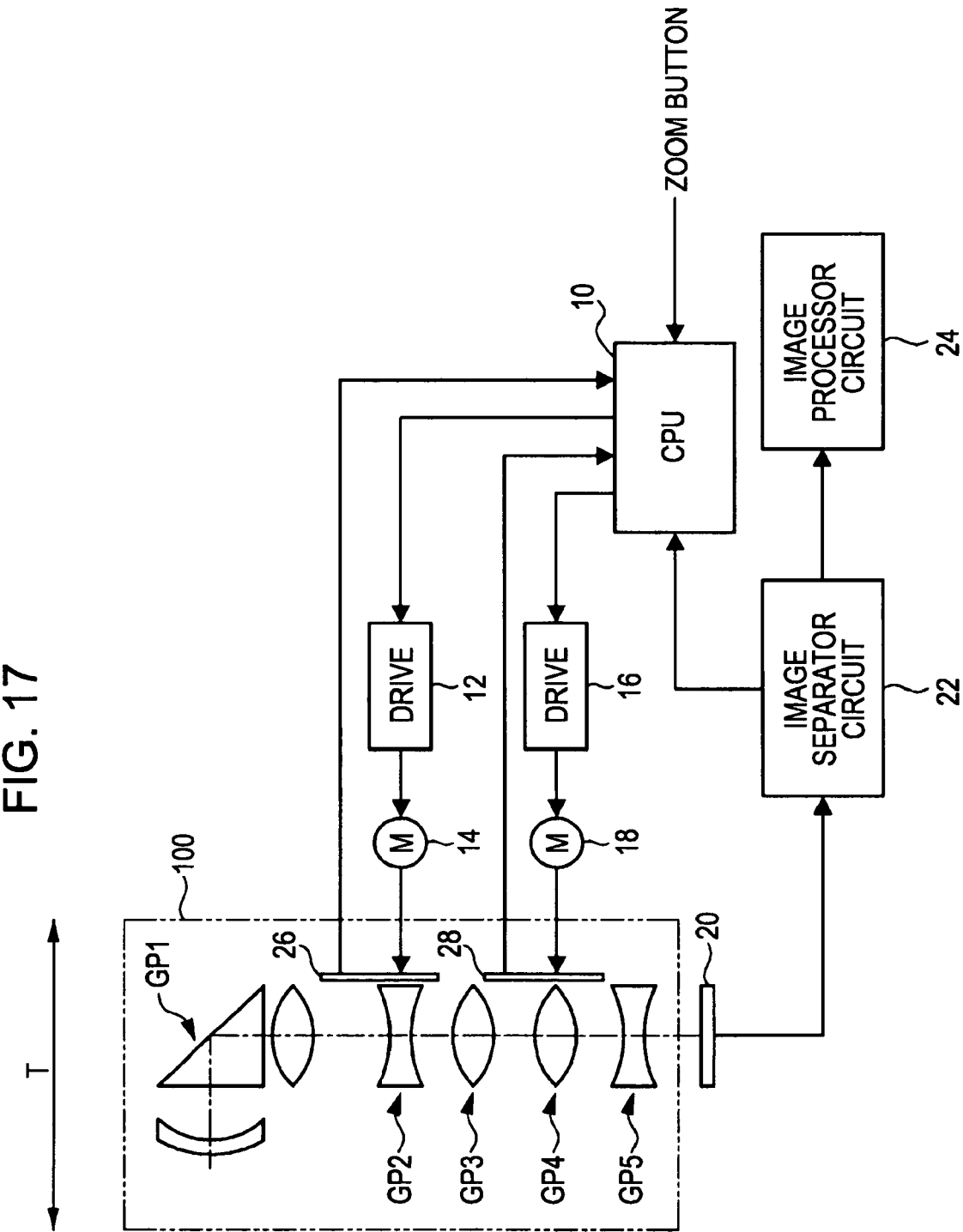

ZOOM LENS AND IMAGE PICKUP APPARATUS

BACKGROUND OF THE INVENTION

1. Field of the Invention

The present invention relates to a zoom lens and an image pickup apparatus.

2. Description of the Related Art

In recent years, an image pickup apparatus, such as a digital still camera, using a solid-state image sensor has become popular. As the digital still camera becomes popular, a higher image quality is demanded. Particularly in a digital still camera with a large number of pixels, a photographic lens having a good imaging performance to meet the solid-state image sensor with a large number of pixels, more particularly, a high magnification zoom lens is demanded. In addition, reduction in size is desired. In particular, a thin zoom lens is desired. In a zoom lens disclosed in any of Japanese Unexamined Patent Application Publication Nos. 8-248318, 2000-131610, and 2003-202500, the reduction in size in an optical-axis direction is promoted by inserting a prism in an optical system. The prism bends an optical path.

SUMMARY OF THE INVENTION

However, with the zoom lens of related art, an object-side lens group (front lens) and the prism may become excessively large if the magnification of the lens is increased. In particular, the thickness of the image pickup apparatus is determined by the prism and a lens near the prism. If the front lens and the prism become large, this is disadvantageous to reduction in size and thickness of the image pickup apparatus. Meanwhile, if the size is reduced, variation in aberration increases, productivity decreases, and the size is not suitable for the increase in magnification. Accordingly, it is difficult to achieve the reduction in size and the increase in magnification by the technique of related art.

It is desirable to provide new and improved zoom lens and image pickup apparatus capable of achieving both the reduction in size and the increase in magnification.

According to an embodiment of the present invention, a zoom lens is provided which includes a first lens group including a first lens, a right-angle prism, and a second lens in that order from the object side, the first lens being a single lens having a negative refractive power, the right-angle prism bending an optical path, the second lens including at least a lens having a positive refractive power, the first lens group having a positive refractive power; a second lens group arranged at the image plane side of the first lens group and including a third lens, a fourth lens, a fifth lens, and a sixth lens in that order from the object side, the third lens including an aspherical surface and having a negative refractive power, the fourth lens having a negative refractive power, the fifth lens having a positive refractive power, the sixth lens having a negative refractive power, the second lens group having a negative refractive power, the second lens group being moved in an optical-axis direction during zooming; a third lens group arranged at the image plane side of the second lens group, the third lens group having a positive refractive power; and a fourth lens group arranged at the image plane side of the third lens group, the fourth lens group having a positive refractive power, the fourth lens group being moved in the optical-axis direction during zooming.

Preferably, Conditional Expression (1) may be satisfied as follows $$0.62 < |fGP2/fw| < 0.7 \qquad (1)$$

where fGP2 is a focal length of the second lens group, and fw is a focal length of a whole system of the zoom lens at the wide-angle end, in Conditional Expression (1).

Preferably, Conditional Expression (2) may be satisfied as follows $$1.5 < |fG1/fG2| < 1.7 \qquad (2)$$

where fG1 is a focal length of the first lens, and fG2 is a focal length of the second lens, in Conditional Expression (2).

Preferably, Conditional Expression (3) may be satisfied as follows $$NdL1 > 1.75 \qquad (3)$$

where NdL1 is a refractive index of the first lens at the d-line, in Conditional Expression (3).

Preferably, Conditional Expression (4) may be satisfied as follows $$VdL1 < 35 \qquad (4)$$

where VdL1 is an Abbe number of the first lens at the d-line, in Conditional Expression (4).

Preferably, Conditional Expression (5) may be satisfied as follows $$NdP > 1.80 \qquad (5)$$

where NdP is a refractive index of the right-angle prism at the d-line, in Conditional Expression (5).

Preferably, at least a surface of the second lens may be an aspherical surface.

According to another embodiment of the present invention, an image pickup apparatus is provided which includes a zoom lens and an image pickup device. The zoom lens includes a first lens group including a first lens, a right-angle prism, and a second lens, in that order from the object side, the first lens being a single lens having a negative refractive power, the right-angle prism bending an optical path, the second lens including at least a lens having a positive refractive power, the first lens group having a positive refractive power, a second lens group arranged at the image plane side of the first lens group and including a third lens, a fourth lens, a fifth lens, and a sixth lens in that order from the object side, the third lens including an aspherical surface and having a negative refractive power, the fourth lens having a negative refractive power, the fifth lens having a positive refractive power, the sixth lens having a negative refractive power, the second lens group having a negative refractive power, the second lens group being moved in an optical-axis direction during zooming, a third lens group arranged at the image plane side of the second lens group, the third lens group having a positive refractive power, and a fourth lens group arranged at the image plane side of the third lens group, the fourth lens group having a positive refractive power, the fourth lens group being moved in the optical-axis direction during zooming. The image pickup device has an image plane on which an object image is formed by the zoom lens.

With the configurations, the zoom lens and the image pickup apparatus capable of achieving both the reduction in size and the increase in magnification can be provided.

BRIEF DESCRIPTION OF THE DRAWINGS

FIG. 17 is a schematic illustration showing a zoom lens according to an embodiment of the present invention.

DESCRIPTION OF THE PREFERRED EMBODIMENTS

Preferred embodiments of the present invention are described below in detail with reference to the attached drawings. In the specification and drawings, like numerals refer like components which have substantially equivalent functions and redundant descriptions of those components are omitted.

First, a zoom lens 100 according to respective embodiments of the present invention is briefly described with reference to FIG. 1. The zoom lens 100 shown in FIG. 1 includes a plurality of lens groups and performs zooming by changing a distance between the lens groups. The zoom lens 100 includes a first lens group GP1 having a positive refractive power, a second lens group GP2 having a negative refractive power, a third lens group GP3 having a positive refractive power, a fourth lens group GP4 having a positive refractive power, and a fifth lens group GP5 having a negative refractive power, in that order from the object side.

The first lens group GP1 includes a first lens G1, a right-angle prism G2, and a second lens G3, in that order from the object side. The first lens G1 is a single lens having a negative refractive power. The right-angle prism G2 bends an optical path. The second lens G3 includes at least a lens having a positive refractive power. The first lens group GP1 has a positive refractive power. The second lens group GP2 includes a third lens G4 having an aspherical surface and a negative refractive power, a fourth lens G5 having a negative refractive power, a fifth lens G6 having a positive refractive power, and a sixth lens G7 having a negative refractive power, in that order from the object side. The second lens group GP2 has a negative refractive power.

The third lens group GP3 includes a seventh lens G8 which is a single lens having a positive refractive power. The third lens group GP3 has a positive refractive power. The fourth lens group GP4 includes an eighth lens G9 and a ninth lens G10 in that order from the object side. The fourth lens group GP4 has a positive refractive power.

The fifth lens group GP5 includes a tenth lens G11 and an eleventh lens G12 in that order from the object side. The fifth lens group GP5 has a negative refractive power. Since the fifth lens group GP5 has a negative refractive power, the fifth lens group GP5 can be reduced in size. In particular, when the fifth lens group GP5 is moved by an optical image stabilizing mechanism for image stabilization, the load of a driving mechanism, and the space occupied by the driving mechanism can be minimized. In the respective embodiments, while the fifth lens group GP5 has the negative refractive power, the fifth lens group GP5 may have a positive refractive power.

Figure 1:
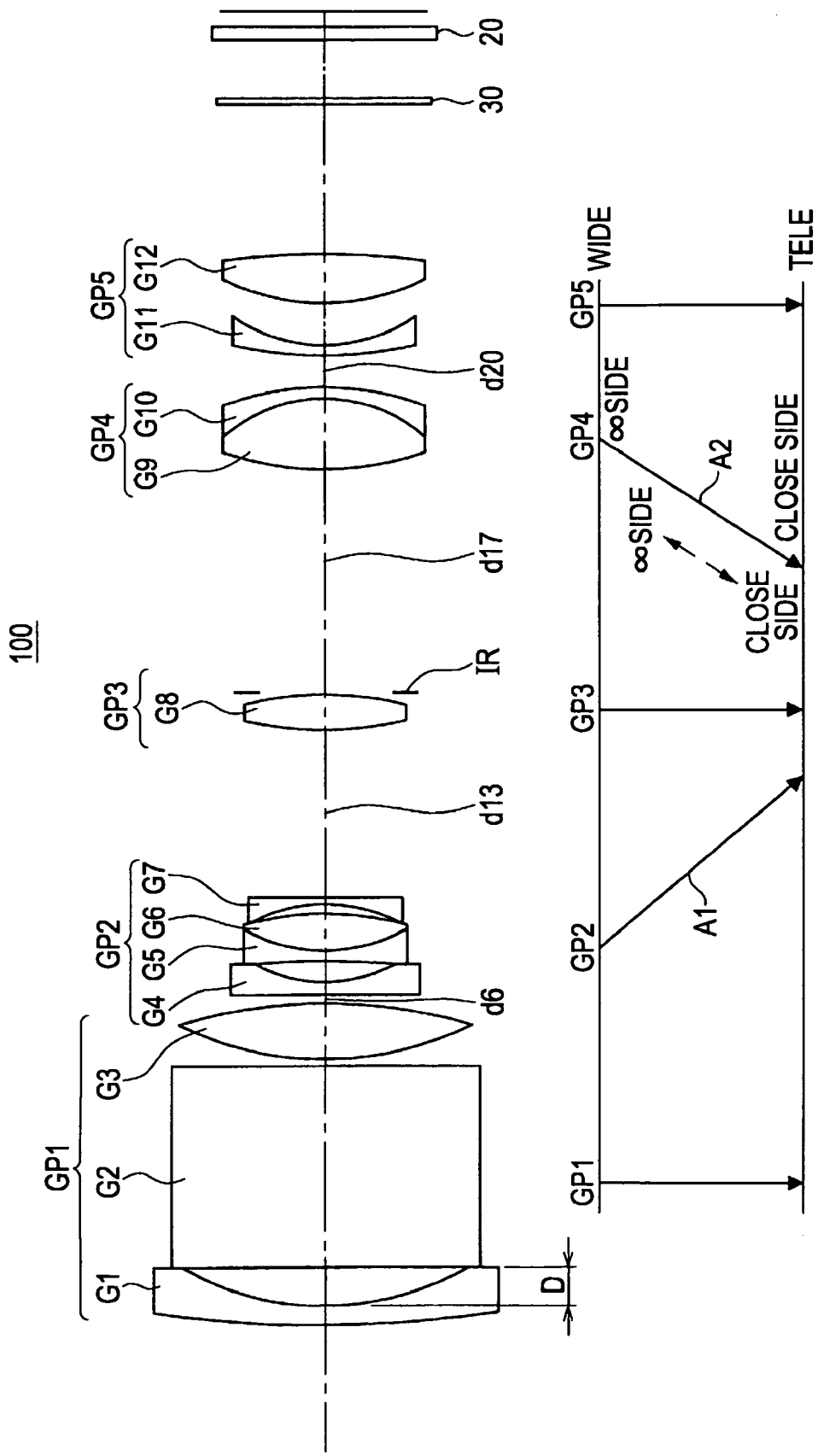
FIG. 1 is a schematic illustration showing a zoom lens according to a first embodiment of the present invention.

Referring to FIG. 1, an image pickup device 20 is arranged at the rear side (the not-object side) of the fifth lens group GP5. An object-side surface of the image pickup device 20 serves as an image plane IMG. A low pass filter (LPF) 30 is arranged between the fifth lens group GP5 and the image pickup device 20.

The second lens group GP2 and the fourth lens group GP4 define a zooming system. By moving the second lens group GP2 and the fourth lens group GP4, zooming is performed. FIG. 1 illustrates a state in which the zoom lens is positioned at the most wide-angle side. Zooming is performed to the telephoto side by moving the second lens group GP2 from the state in FIG. 1 in a direction indicated by arrow A1 and moving the fourth lens group GP4 from the state in FIG. 1 in a direction indicated by arrow A2.

In the second lens group GP2 and the fourth lens group GP4, the second lens group GP2 has a main zooming function. Also, at any zooming position, focus adjustment is performed by moving only the fourth lens group GP4. At this time, focusing in the close side is achieved by moving the fourth lens group GP4 toward the object side (arrow A2), and focusing in the infinite side is achieved by moving the fourth lens group GP4 toward the image plane side. By moving the fourth lens group GP4, a focal length and an in-focus position are adjusted, for example, during zooming, or when a distance to an object is changed.

As described above, the third lens group GP3 having the positive refractive power, the fourth lens group GP4 having the positive refractive power, and the fifth lens group GP5 having the negative refractive power are arranged in that order at the image plane side of the second lens group GP2. For zooming, the second lens group GP2 and the fourth lens group GP4 are moved. Accordingly, a compact and high magnification zoom lens is provided.

Next, configurations of the respective lens groups, in particular, configurations of the first lens group GP1 and the second lens group GP2 are described in detail. Since the single first lens G1 having the negative refractive power is arranged at the most object side, the first lens group GP1 can collect light beams using the negative refractive power. Hence, the right-angle prism G2 arranged immediately at the image-pickup-surface side of the first lens G1 can be reduced in size. Accordingly, the first lens group GP1 can be markedly reduced in size. In particular, the first lens group GP1 has a function of reducing the thickness of the image pickup apparatus by bending the optical axis. The optical axis of the first lens group GP1 extends in the thickness direction of the image pickup apparatus, and hence, by reducing the size of the first lens group GP1, the thickness of the image pickup apparatus can be minimized. In this embodiment, the prism G2 is formed of a glass block having a function of bending the optical path. The prism G2 does not have a positive or negative refractive power. Alternatively, the prism G2 may have a refractive power.

To reduce the size of the prism G2, the first lens G1 preferably has a strong negative refractive power. However, since the first lens group GP1 has the positive refractive power, aberration may easily appear. Owing to this, at least a surface of the lenses of the first lens group GP1 is an aspherical surface. Accordingly, various aberration, such as distortion and coma, can be easily corrected. For example, an object-side surface or an image-plane-side surface of the second lens G3 may be aspherical. Also, an object-side surface s1 of the first lens G1 is preferably convex toward the object side. When the surface s1 is concave toward the object side, a negative distortion generated at the concave surface s1 becomes large because the light beams are bent. It is difficult to correct the distortion by the whole lens system. Since the surface s1 is convex toward the object side, the optical path can be gradually bent, and the distortion generated at the first lens G1 is effectively corrected.

The second lens group GP2 has the strong negative refractive power to bring an entrance pupil position closer to the first lens group GP1. Since the entrance pupil position of the whole lens system of the zoom lens is brought closer to the object plane side, the right-angle prism G2 can be reduced in size, and the reduction in thickness of the zoom lens in the optical-axis direction can be achieved.

When the entrance pupil position is retracted to the image plane side, the first lens group GP1 is increased in size, and aberration likely appears. Thus, the entrance pupil position is preferably located at the most object side as much as possible. In particular, in the zoom lens with the increased magnification, the entrance pupil position affects the whole lens system. When the entrance pupil position is located at the image plane side, the lens system may be increased in size, and variation in aberration during zooming likely occurs owing to this, in this embodiment, the first lens group GP1 has the negative refractive power, and the second lens group GP2 has the positive refractive power. Accordingly, the entrance pupil position is brought closer to the object side. By bringing the entrance pupil position of the whole lens system to the object plane side, the first lens group GP1 and the prism G2 can be reduced in size while the variation in aberration during zooming is suppressed even when the magnification is increased.

To increase the negative refractive power, the second lens group GP2 includes the third lens G4 having the negative refractive power, the fourth lens G5 having the negative refractive power, the fifth lens G6 having the positive refractive power, and the sixth lens G7 having the negative refractive power, in that order from the object side. With such configuration of the second lens group GP2 having the negative refractive power, the negative refractive power is not concentrated at a small number of lenses. The negative refractive power can be allocated to the third lens G4, the fourth lens G5, and the sixth lens G7. Thus, the aberration can be reduced. Since the second lens group GP2 is moved during zooming, the variation in aberration during zooming can be minimized. In comparison with a case in which the second lens group GP2 includes lenses having negative refractive powers, since the second lens group GP2 has the fifth lens G6 having the positive refractive power, the aberration can be reliably suppressed.

Further, in the second lens group GP2, an object-side surface of the third lens G4 having the negative refractive power is an aspherical lens. Thus, the aberration, which is generated when the negative refractive power of the second lens group GP2 is increased, can be suppressed. In particular, coma at the wide-angle side and spherical aberration at the telephoto side, which are generated when the negative refractive power of the second lens group GP2 is increased, can be efficiently corrected. The aberration generated due to the reduction in size can be reliably suppressed. Herein, by arranging the aspherical surface at the object side, the aberration of off-axis light beams can be easily corrected. The aspherical surface is effectively used to efficiently correct the aberration of the off-axis light beams at the wide-angle side. Also, when zooming toward the telephoto side is performed, the light beams pass the whole lenses. Thus, not only the off-axis aberration, but also on-axis aberration can be corrected. Thus, the spherical aberration can be efficiently corrected. Since the object-side surface of the third lens G4 is the aspherical surface, the appearance of the aberration can be reliably suppressed. Accordingly, the reduction in size and the increase in magnification can be achieved. The object-side surface of the third lens G4 is a concave surface, and hence, it is difficult to form the concave surface as an aspherical surface. However, forming the concave aspherical surface becomes realized, for example, by an improvement of a glass material and an improvement of a molding technique. The third lens G4 having the aspherical surface can be formed by glass molding.

In addition, in the second lens group GP2, the fourth lens G5 having the negative refractive power is preferably cemented with the fifth lens G6 having the positive refractive power, or the fifth lens G6 having the positive refractive power is preferably cemented with the sixth lens G7 having the negative refractive power. Accordingly, a chromatic aberration can be effectively corrected. Also, misalignment of axes of the cemented lenses can be prevented. When the lenses are cemented, the length of the lenses in the optical-axis direction is increased. Thus, the lenses can be easily assembled with a lens barrel. Also, the lenses are not inclined with respect to the lens barrel. Thus, the accuracy can be secured. The chromatic aberration can be efficiently corrected by a single-position bonding. For the reduction in size of the second lens group GP2, two or more bonding surfaces do not have to be provided in the second lens group GP2.

In the third lens group GP3, at least one surface of the lenses of the third lens group GP3 is preferably an aspherical surface. In particular, at least one surface of the seventh lens G8 located at the most object side is preferably an aspherical surface. The lenses arranged at the front and rear sides of an aperture stop affect the spherical aberration. Hence, by arranging the aspherical surface at the surface of the lens of the third lens group GP3 arranged immediately at the object side of the aperture stop, the spherical aberration can be easily corrected, and the reduction in size of the whole lens system becomes easy.

Next, conditional expressions that determine the configuration of the zoom lens 100 of this embodiment is described. The zoom lens 100 of this embodiment satisfies Conditional Expression (1) as follows:

$$0.62 < |fGP2/fw| < 0.7 \tag{1}$$

where fGP2 is a focal length of the second lens group GP2, and fw is a focal length of the whole lens system at the wide-angle end, in Conditional Expression (1).

Conditional Expression (1) determines a ratio of the focal length of the second lens group GP2 having the negative refractive power to the focal length of the whole lens system at the wide-angle end. That is, if the value of |fGP2/fw| is 0.62 or smaller, the negative refractive power of the second lens group GP2 becomes excessively strong. Spherical aberration and coma at a peripheral portion of a screen are generated. It is difficult to correct the aberration. If the value of |fGP2/fw| is 0.7 or greater, the refractive power of the second lens group GP 2 as a variator becomes weak. The moving distance of the second lens group GP2 during zooming is increased, and hence, the lens system is increased in size. Accordingly, it is difficult to reduce the size and to increase the magnification of the zoom lens. By satisfying Conditional Expression (1), the moving distance of the variator can be reduced while the spherical aberration and the coma at the peripheral portion of the screen are reliably corrected. By reducing the size of the first lens group GP1, the reduction in size and the increase in magnification can be achieved.

The zoom lens 100 of this embodiment preferably satisfies Conditional Expression (2) as follows:

$$1.5 < |fG1/fG2| < 1.7 \tag{2}$$

where fG1 is a focal length of the first lens G1, and fG2 is a focal length of the second lens G3, in Conditional Expression (2).

Conditional Expression (2) determines a ratio of the focal length fG1 of the first lens G1 to the focal length fG3 of the second lens G3 in the first lens group GP1. That is, if the value of |fG1/fG2| is 1.5 or smaller, the negative refractive power of the first lens G1 becomes excessively strong, the curvature of the object-side first lens G1 becomes small, and the optical path is markedly bent by the first lens G1. Owing to this, coma and distortion are generated, and it is difficult to correct the aberration. Since the curvature radius of the first lens G1 becomes small, a sag amount (a distance D in FIG. 1) in a peripheral portion of the lens is increased. This configuration is disadvantageous to the reduction in thickness of the first lens G1 in the optical-axis direction. If the value of |fG1/fG2| is 1.7 or greater, the positive refractive power of the first lens group GP1 becomes strong. Hence, spherical aberration appears, and it is difficult to correct the aberration.

Satisfying both Conditional Expressions (1) and (2) is preferable to further promote the reduction in size and the increase in magnification. By satisfying Conditional Expressions (1) and (2), the moving distance of the variator can be reduced while the spherical aberration and the coma at the peripheral portion of the screen are reliably corrected. The size of the first lens group GP1 can be reduced, and therefore, the reduction in size and the increase in magnification can be achieved.

The zoom lens 100 of this embodiment preferably satisfies Conditional Expression (3) as follows:

$$NdL1 > 1.75 \tag{3}$$

where NdL1 is a refractive index of the first lens G1 at the d-line, in Conditional Expression (3).

Conditional Expression (3) determines the material of the first lens G1 which is the single lens having the negative refractive power of the first lens group GP1 having the positive refractive power. Conditional Expression (3) determines the amount of distortion due to the first lens G1. The negative refractive power of the first lens group GP1 relies on the first lens G1. If the refractive index of the first lens G1 decreases, and the value of NdL1 is out of a range determined by Conditional Expression (3), the curvature of the first lens G1 has to be decreased to have the negative refractive power. The amount of distortion becomes excessively large with respect to the necessary refractive power of the first lens group GP1. Owing to this, it is difficult to achieve the reduction in size and the increase in magnification. By satisfying Conditional Expression (3), the distortion can be reliably suppressed.

The zoom lens 100 of this embodiment preferably satisfies Conditional Expression (4) as follows:

$$VdL1 < 35 \tag{4}$$

where VdL1 is an Abbe number of the first lens G1, in Conditional Expression (4).

Conditional Expression (4) determines the amount of chromatic aberration due to the first lens G1 which is the single lens having the negative refractive power of the first lens group GP1 having the positive refractive power. That is, if the value of VdL1 is out of a range determined by Conditional Expression (4), the amount of chromatic aberration within the first lens group GP1 having the positive refractive power is increased. It is difficult to correct the chromatic aberration as the whole lens system. By satisfying Conditional Expression (4), the chromatic aberration can be reliably suppressed.

Conditional Expressions (3) and (4) suppress the occurrence of the aberration generated because the negative refractive power of the first lens group GP1 is increased. Satisfying both Conditional Expressions (3) and (4) is preferable to correct the aberration.

The zoom lens 100 of this embodiment preferably satisfies Conditional Expression (5) as follows:

$$NdP > 1.80 \tag{5}$$

where NdP is a refractive index of the right-angle prism at the d-line, in Conditional Expression (5).

Conditional Expression (5) determines the refractive index of the prism G2. If the value of NdP is 1.8 or smaller, the optical-path length is not shortened, and hence, the prism G2 is increased in size. By satisfying Conditional Expression (5) and increasing the refractive index of the prism G2, the reduction in size and the increase in magnification can be achieved.

Regarding the movement of the respective lens groups during zoom adjustment and focus adjustment, the first lens group GP1 is preferably fixed relative to the image plane during zooming. Since the weight of the right-angle prism for bending the optical path is relatively large in the first lens group GP1, a load is applied to the driving mechanism when the first lens group GP1 is moved. Since the optical axis of the first lens group GP1 extends in the thickness direction of the image pickup apparatus, the thickness of the image pickup apparatus is increased due to the driving mechanism that drives the first lens group GP1. Accordingly, the first lens group GP1 is preferably fixed relative to the image plane.

First Embodiment

Next, the zoom lens 100 according to the respective embodiments of the present invention is described in detail with reference to a specific example. Referring to FIG. 1, the zoom lens 100 according to the first embodiment is described. The zoom lens 100 of the first embodiment includes a first lens group GP1 having a positive refractive power, a second lens group GP2 having a negative refractive power, a third lens group GP3 having a positive refractive power, a fourth lens group GP4 having a positive refractive power, and a fifth lens group GP5 having a negative refractive power, in that order from the object side.

The first lens group GP1 includes a negative lens G1, a right-angle prism G2 for bending the optical axis by 90 degrees, and a positive lens G3 having aspherical surfaces on both surfaces. The second lens group GP2 includes a negative lens G4, a cemented lens of a negative lens G5 and a positive lens G6, and a negative lens G7. The third lens group GP3 includes a positive lens G8 having aspherical surfaces on both surfaces. The fourth lens group GP4 includes a cemented lens of a positive lens G9 and a negative lens G10. The positive lens G9 has an object-side aspherical surface. The fifth lens group GP5 includes a negative lens G11 and a positive lens G12.

When the lens position is changed from the wide-angle end to the telephoto end, the second lens group GP2 and the fourth lens group GP4 are moved in directions indicated by arrows A1 and A2.

Example 1

Table 1 shows numerical values of Example 1 which is a specific configuration of the zoom lens 100 according to the first embodiment. In the specification, "Si" represents an i-th surface from the object side, "d" represents an axial surface distance between the i-th surface from the object side and an (i+1)-th surface, "ni" represents a refractive index at the d-line of a medium having the i-th surface from the object side, and "vi" is an Abbe number of the medium having the i-th surface from the object side. Also, "INFINITY" represents a flat surface, and "ASP" represents an aspherical surface.

TABLE 1

| Si | ri | Aspherical surface | di | ni | vi |
|---|---|---|---|---|---|
| 1 | 42.254 | | 0.750 | 1.92286 | 20.9 |
| 2 | 10.891 | | 1.550 | | |
| 3 | INFINITY | | 8.100 | 1.90366 | 42.984 |
| 4 | INFINITY | | 0.200 | | |
| 5 | 10.732 | ASP | 2.271 | 1.69350 | 53.2 |
| 6 | −21.260 | ASP | Variable | | |
| 7 | 1012.476 | ASP | 0.600 | 1.85135 | 40.1 |
| 8 | 6.033 | ASP | 0.775 | | |
| 9 | −41.199 | | 0.430 | 1.88300 | 40.8 |
| 10 | 6.662 | | 1.486 | 1.84666 | 23.8 |
| 11 | −12.712 | | 0.319 | | |
| 12 | −6.765 | | 0.430 | 1.88300 | 40.8 |
| 13 | −74.846 | | Variable | | |
| 14 | 13.030 | ASP | 1.417 | 1.58313 | 59.5 |
| 15 | −12.975 | ASP | 0.200 | | |
| 16 | INFINITY | | 1.500 | | |
| 17 | INFINITY | | Variable | | |
| 18 | 12.176 | ASP | 2.799 | 1.58313 | 59.5 |
| 19 | −6.121 | | 0.430 | 1.71736 | 29.5 |
| 20 | −11.911 | | Variable | | |
| 21 | 16.907 | | 0.430 | 2.00069 | 25.5 |
| 22 | 5.753 | | 1.660 | | |
| 23 | 8.669 | | 1.698 | 1.48749 | 70.4 |
| 24 | −162.408 | | 6.252 | | |
| 25 | INFINITY | | 0.800 | 1.51680 | 64.2 |
| 26 | INFINITY | | 3.000 | | |

In the zoom lens according to the first embodiment, when the focal position is changed, an axial surface distance (air distance) dG between the first lens group GP1 and the second lens group GP2, an axial surface distance (air distance) d13 between the second lens group GP2 and the third lens group GP3, an axial surface distance (air distance) d16 between an aperture stop IR and the fourth lens group GP4, and an axial surface distance (air distance) d19 between the fourth lens group GP4 and the fifth lens group GP5, are variable. Table 2 shows axial surface distances (air distances) at the wide-angle end, the intermediate focal position, and the telephoto end, together with F-numbers FNO and half view angles ω. Reference character f represents focal lengths of the whole lens system.

TABLE 2

| f | 6.102 | 10.493 | 22.702 |
|---|---|---|---|
| Fno | 3.63 | 3.80 | 4.77 |
| ω | 33.625 | 19.902 | 9.374 |
| d6 | 0.397 | 3.712 | 6.602 |
| d13 | 6.604 | 3.289 | 0.400 |
| d17 | 7.483 | 4.821 | 0.602 |
| d20 | 1.333 | 3.995 | 8.214 |

In the first embodiment, both surfaces s5 and s6 of the second lens G3, both surfaces s14 and s15 of the seventh lens G8, and an object-side surface s17 of the eighth lens G9 are aspherical. Table 3 shows conic constants K of the surfaces and aspherical coefficients A, B, C, and D of the 4th, 6th, 8th, and 10th orders according to Numerical Example 1. In the specification, the aspherical shape of determined by Expression (6) as follows:

$$X = \frac{y^2 * c^2}{1 + \{1 - (1+k)*Y^2 * c^2\}^{1/2}} + \sum Ai * Y \quad (6)$$

where x is a distance from a vertex of a lens surface in the optical-axis direction, y is a height in a direction perpendicular to the optical axis, c is a paraxial curvature at the lens vertex, K is a conic constant, and Ai is an i-th order aspherical coefficient.

TABLE 3

| si | K | A | B | C | D |
|---|---|---|---|---|---|
| 5 | −0.508 | −7.159E−05 | −1.206E−07 | 2.892E−08 | −2.253E−09 |
| 6 | −0.149 | 2.392E−05 | 7.460E−07 | −1.927E−08 | −1.211E−09 |
| 7 | 0.000 | 1.861E−04 | 4.409E−06 | 1.553E−07 | −7.470E−10 |
| 8 | 0.000 | −3.101E−04 | 9.557E−06 | −4.037E−07 | 1.495E−07 |
| 14 | −2.296 | −1.136E−04 | 6.949E−06 | 6.680E−07 | 2.631E−08 |
| 15 | −0.767 | 5.280E−05 | 5.890E−06 | 5.722E−07 | 3.392E−08 |
| 18 | 0.000 | −2.198E−04 | 5.181E−06 | −4.126E−07 | 1.731E−08 |

Figure 2:
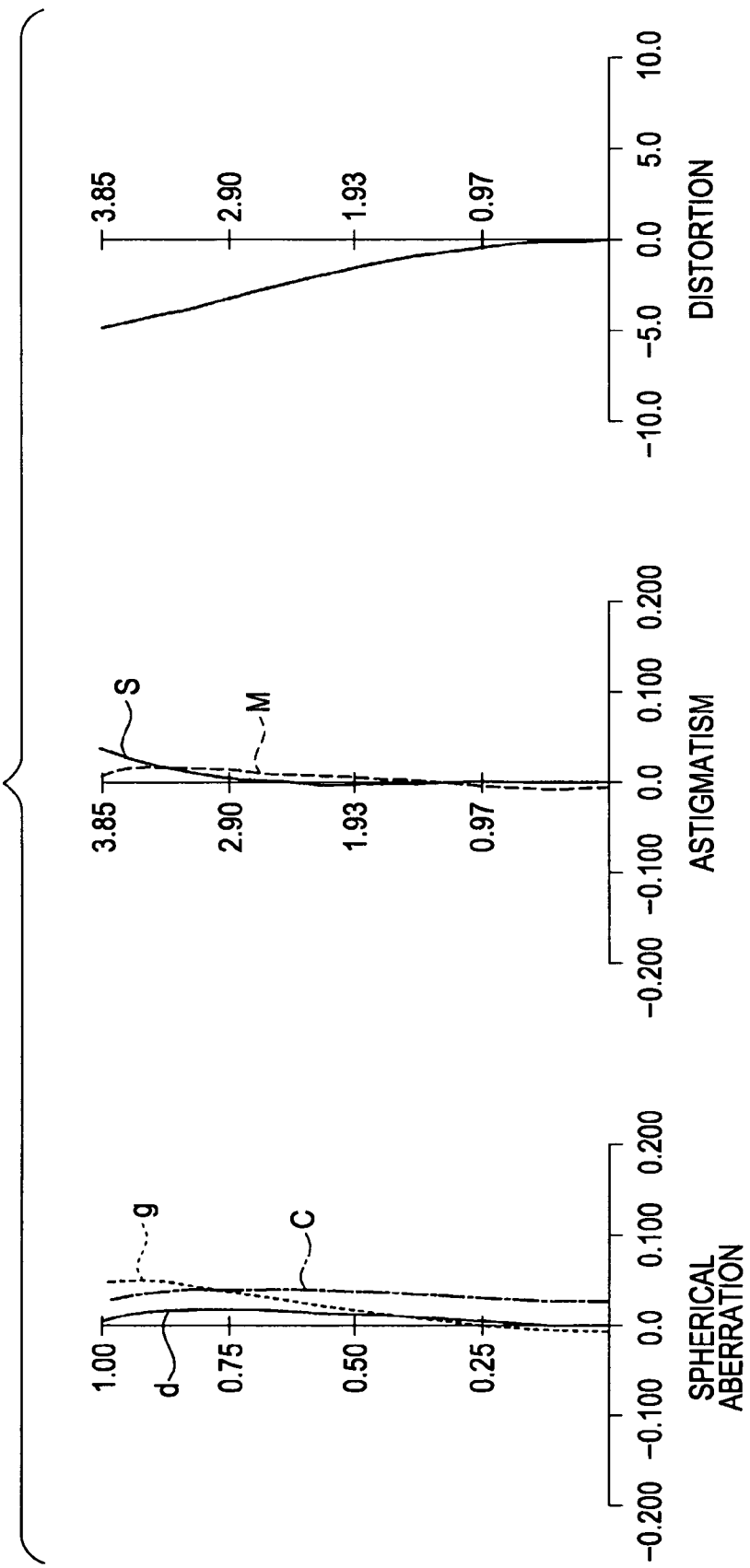
FIG. 2 illustrates characteristic diagrams of spherical aberration, astigmatism, and distortion according to Example 1.
Figure 3:
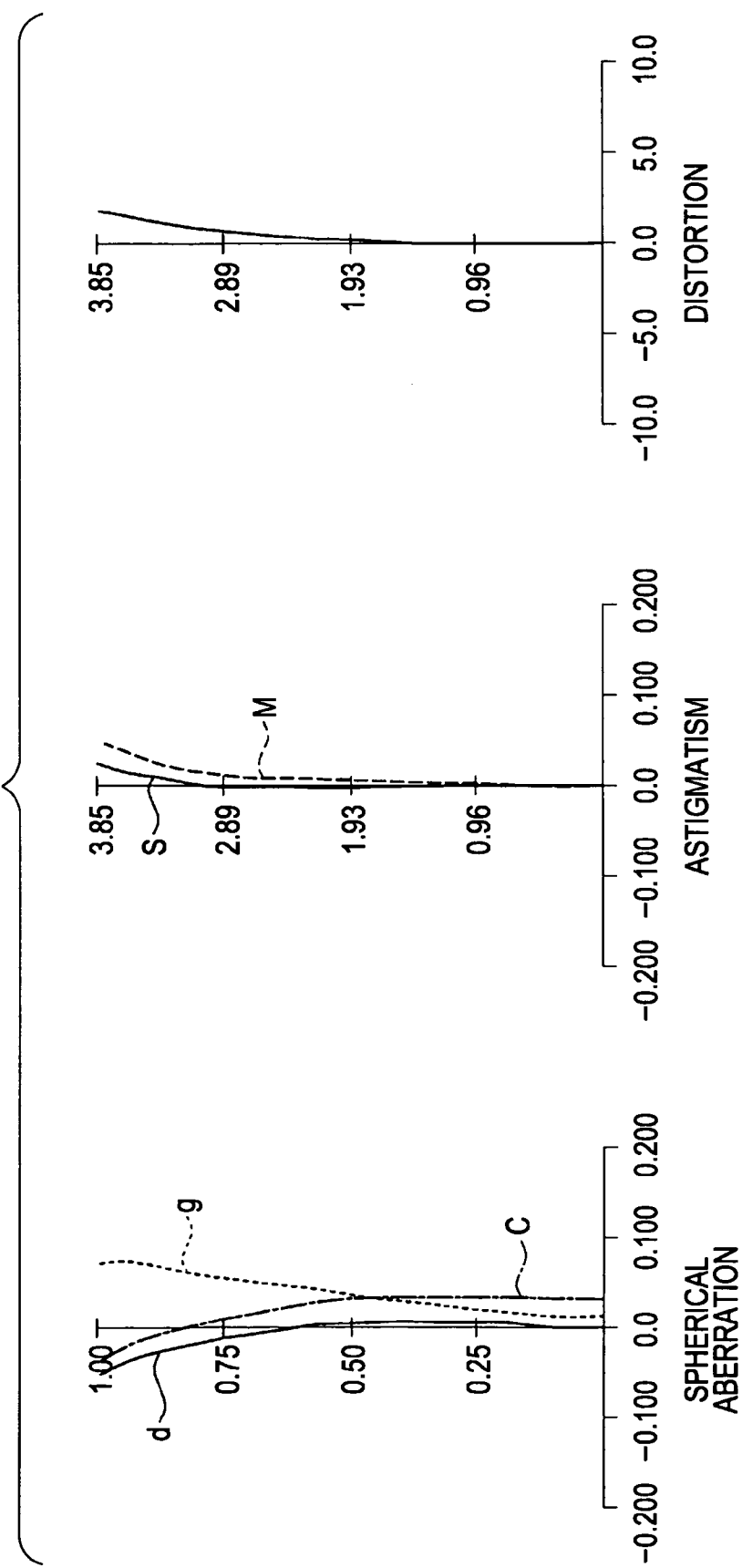
FIG. 3 illustrates characteristic diagrams of spherical aberration, astigmatism, and distortion according to Example 1.
Figure 4:
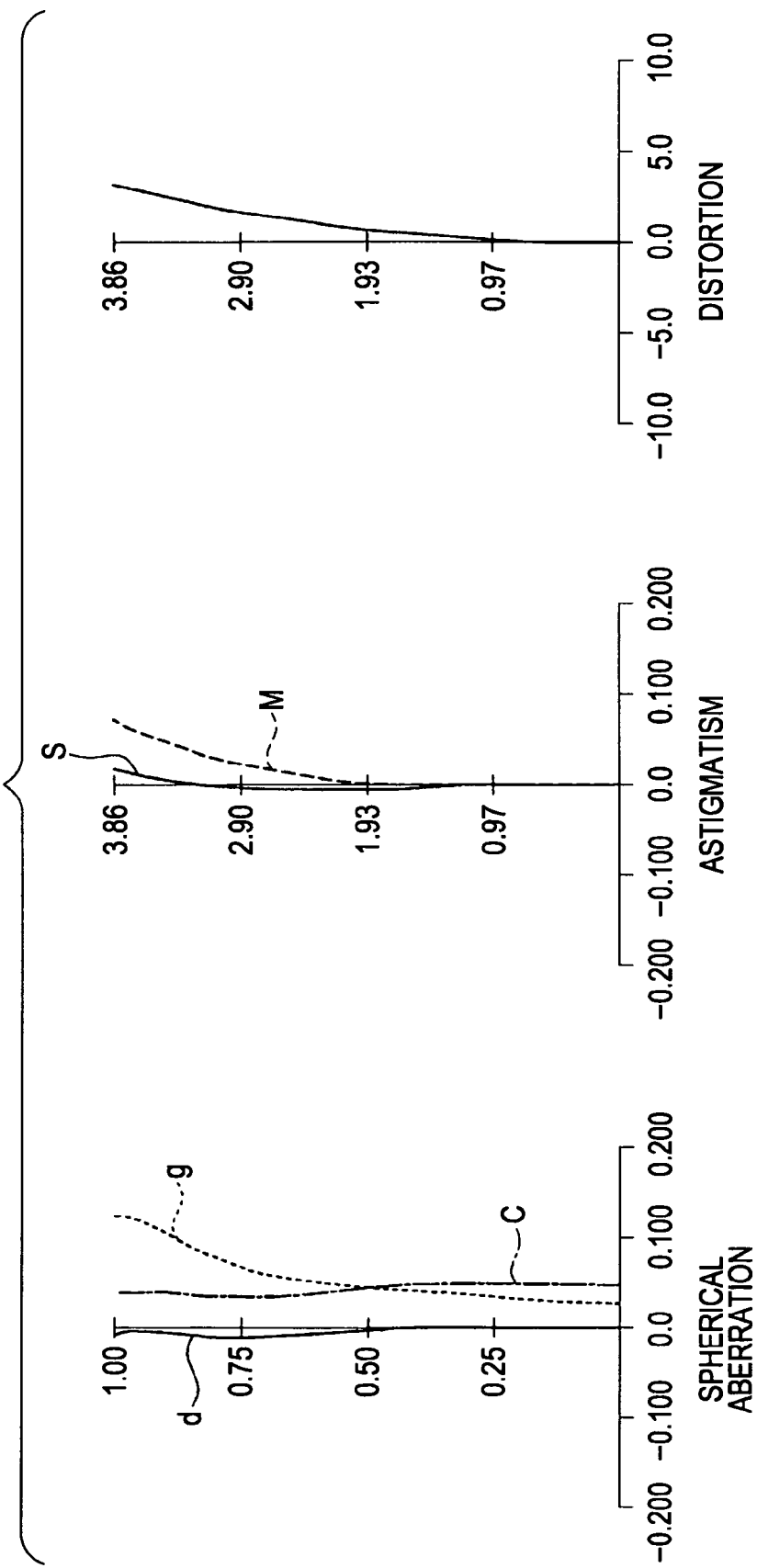
FIG. 4 illustrates characteristic diagrams of spherical aberration, astigmatism, and distortion according to Example 1.

FIGS. 2 to 4 are characteristic diagrams showing spherical aberration, astigmatism, and distortion according to Example 1. In the spherical aberration, the vertical axis plots a ratio to an open F-number, and the horizontal axis plots a defocus. The solid line illustrates the spherical aberration at the d-line, the broken line illustrates the spherical aberration at the g-line, and the dotted-chain line illustrates the spherical aberration at the C-line. In the astigmatism, the vertical axis plots an image height, and the horizontal axis plots a focus. The solid line illustrates a sagittal field curvature S and the broken line illustrates a meridional field curvature M. In the distortion, the vertical axis plots an image height, and the horizontal axis plots the distortion (%).

Second Embodiment

Figure 5:
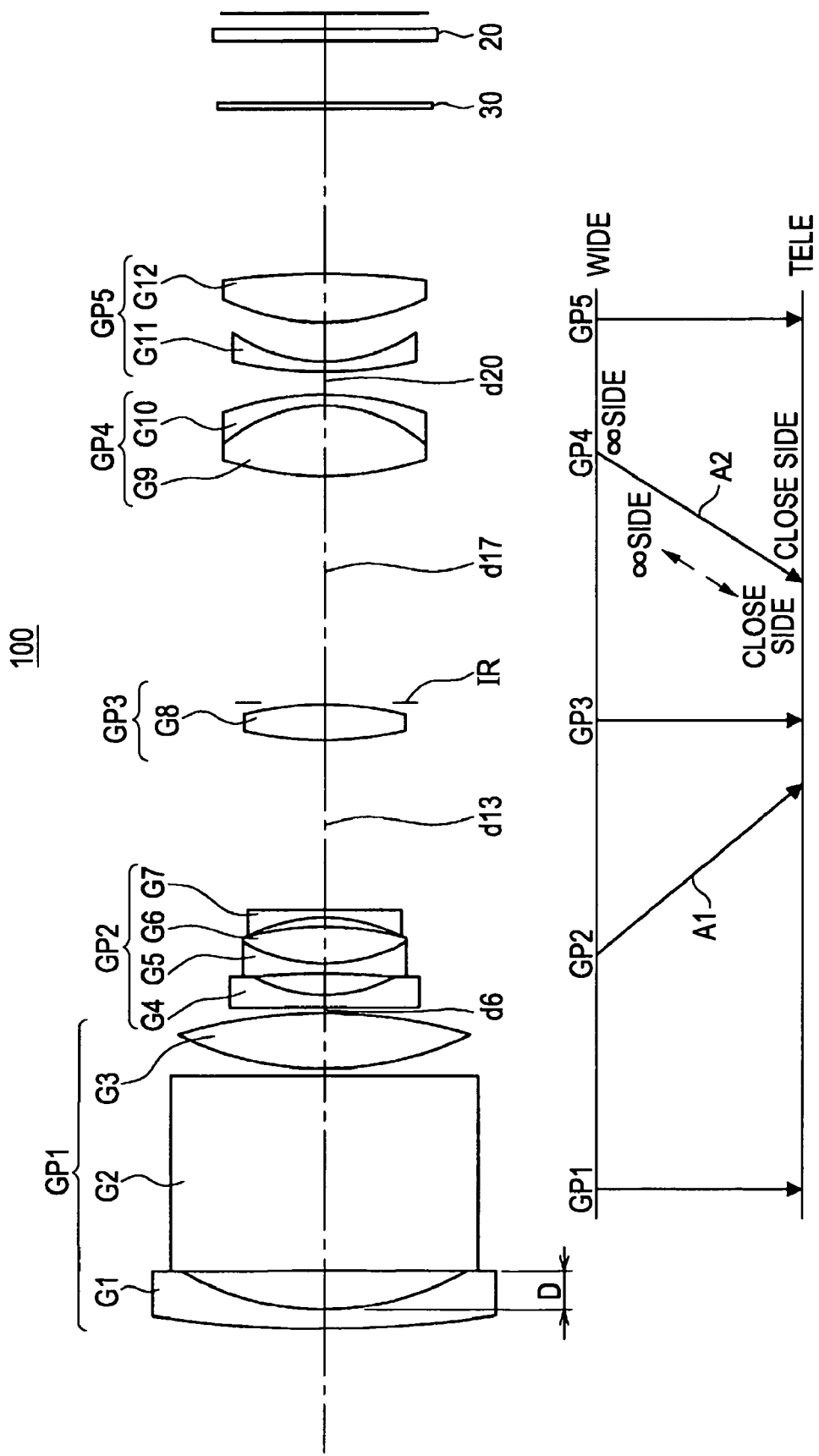
FIG. 5 is a schematic illustration showing a zoom lens according to a second embodiment of the present invention.

FIG. 5 is a schematic illustration showing a zoom lens 100 according to a second embodiment. The zoom lens 100 of the second embodiment includes a first lens group GP1 having a positive refractive power, a second lens group GP2 having a negative refractive power, a third lens group GP3 having a positive refractive power, a fourth lens group GP4 having a positive refractive power, and a fifth lens group GP5 having a negative refractive power, in that order from the object side.

The first lens group GP1 includes a negative lens G1, a right-angle prism G2 for bending the optical axis by 90 degrees, and a positive lens G3 having aspherical surfaces on both surfaces. The second lens group GP2 includes a negative lens G4, a cemented lens of a negative lens G5 and a positive lens G6, and a negative lens G7. The third lens group GP3 includes a positive lens G8 having aspherical surfaces on both surfaces. The fourth lens group GP4 includes a cemented lens of a positive lens G9 and a negative lens G10. The positive lens G9 has an object-side aspherical surface. The fifth lens group GP5 includes a negative lens G11 and a positive lens G12.

When the lens position is changed from the wide-angle end to the telephoto end, the second lens group GP2 and the fourth lens group GP4 are moved in directions indicated by arrows A1 and A2.

Example 2

Table 4 shows numerical values of Example 2 which is a specific configuration of the zoom lens 100 according to the second embodiment.

TABLE 4

| Si | ri | Aspherical surface | di | ni | vi |
|---|---|---|---|---|---|
| 1 | 36.704 | | 0.750 | 1.92286 | 20.9 |
| 2 | 11.511 | | 1.550 | | |
| 3 | INFINITY | | 8.100 | 1.90366 | 42.984 |
| 4 | INFINITY | | 0.200 | | |
| 5 | 10.710 | ASP | 2.069 | 1.69350 | 53.2 |
| 6 | −24.153 | ASP | Variable | | |
| 7 | −62.064 | ASP | 0.600 | 1.85135 | 40.1 |
| 8 | 5.432 | ASP | 0.785 | | |
| 9 | −51.275 | | 0.430 | 1.78590 | 43.9 |
| 10 | 6.968 | | 1.442 | 1.84666 | 23.8 |
| 11 | −18.701 | | 0.378 | | |
| 12 | −6.924 | | 0.430 | 1.80611 | 40.7 |
| 13 | −26.916 | | Variable | | |
| 14 | 12.892 | ASP | 1.362 | 1.58313 | 59.5 |
| 15 | −13.293 | ASP | 0.200 | | |
| 16 | INFINITY | | 1.500 | | |
| 17 | INFINITY | | Variable | | |
| 18 | 13.635 | ASP | 2.813 | 1.58313 | 59.5 |
| 19 | −5.606 | | 0.430 | 1.80610 | 33.3 |
| 20 | −10.748 | | Variable | | |
| 21 | 18.029 | | 0.430 | 2.00069 | 25.5 |
| 22 | 6.346 | | 1.703 | | |
| 23 | 10.128 | | 2.007 | 1.48749 | 70.4 |
| 24 | −47.032 | | 6.625 | | |
| 25 | INFINITY | | 0.800 | 1.51680 | 64.2 |
| 26 | INFINITY | | 3.000 | | |

In the zoom lens according to the second embodiment, when the focal position is changed, an axial surface distance (air distance) d6 between the first lens group GP1 and the second lens group GP2, an axial surface distance (air distance) d13 between the second lens group GP2 and the third lens group GP3, an axial surface distance (air distance) d16 between an aperture stop IR and the fourth lens group GP4, and an axial surface distance (air distance) d19 between the fourth lens group GP4 and the fifth lens group GP5, are variable. Table 5 shows axial surface distances (air distances) at the wide-angle end, the intermediate focal position, and the telephoto end, together with F-numbers FNO and half view angles ω. Reference character f represents focal lengths of the whole lens system.

TABLE 5

| f | 6.203 | 10.662 | 23.066 |
|---|---|---|---|
| Fno | 3.65 | 3.81 | 4.66 |
| ω | 33.207 | 19.556 | 9.229 |
| d6 | 0.400 | 3.788 | 6.856 |

TABLE 5-continued

| d13 | 6.856 | 3.468 | 0.400 |
|---|---|---|---|
| d17 | 7.740 | 4.905 | 0.695 |
| d20 | 0.900 | 3.735 | 7.945 |

In the second embodiment, both surfaces s5 and s6 of the second lens G3, both surfaces s7 and s8 of the third lens G4, both surfaces s14 and s15 of the seventh lens G8, and an object-side surface s17 of the eighth lens G9 are aspherical. Table 6 shows conic constants K of the surfaces and aspherical coefficients A, B, C, and D of the 4th, 6th, 8th, and 10th orders according to Example 2.

TABLE 6

| si | K | A | B | C | D |
|---|---|---|---|---|---|
| 5 | −0.079 | −1.140E−04 | 5.552E−08 | 1.744E−08 | −1.434E−09 |
| 6 | 0.007 | 1.018E−05 | 1.301E−06 | −2.337E−08 | −6.632E−10 |
| 7 | 0.000 | 7.799E−05 | 3.076E−06 | 1.623E−07 | 3.792E−10 |
| 8 | 0.000 | −6.641E−04 | 7.335E−06 | −2.056E−06 | 2.145E−07 |
| 14 | 0.000 | −1.460E−04 | 1.482E−05 | 4.687E−07 | 3.397E−08 |
| 15 | 0.000 | 2.005E−04 | 8.456E−06 | 1.120E−06 | 9.509E−09 |
| 18 | 0.000 | −1.001E−04 | 4.090E−06 | −8.390E−08 | 6.934E−09 |

Figure 6:
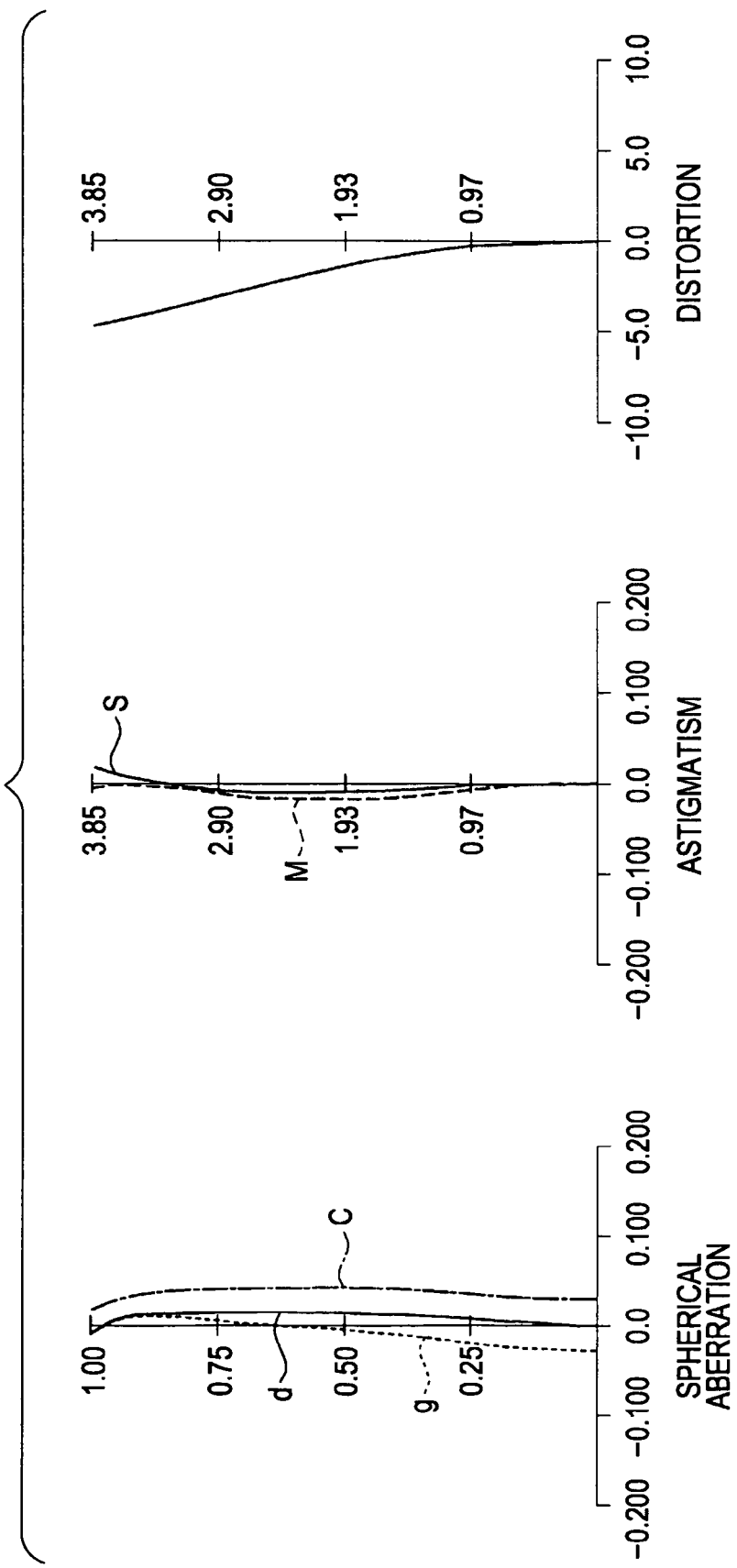
FIG. 6 illustrates characteristic diagrams of spherical aberration, astigmatism, and distortion according to Example 2.
Figure 7:
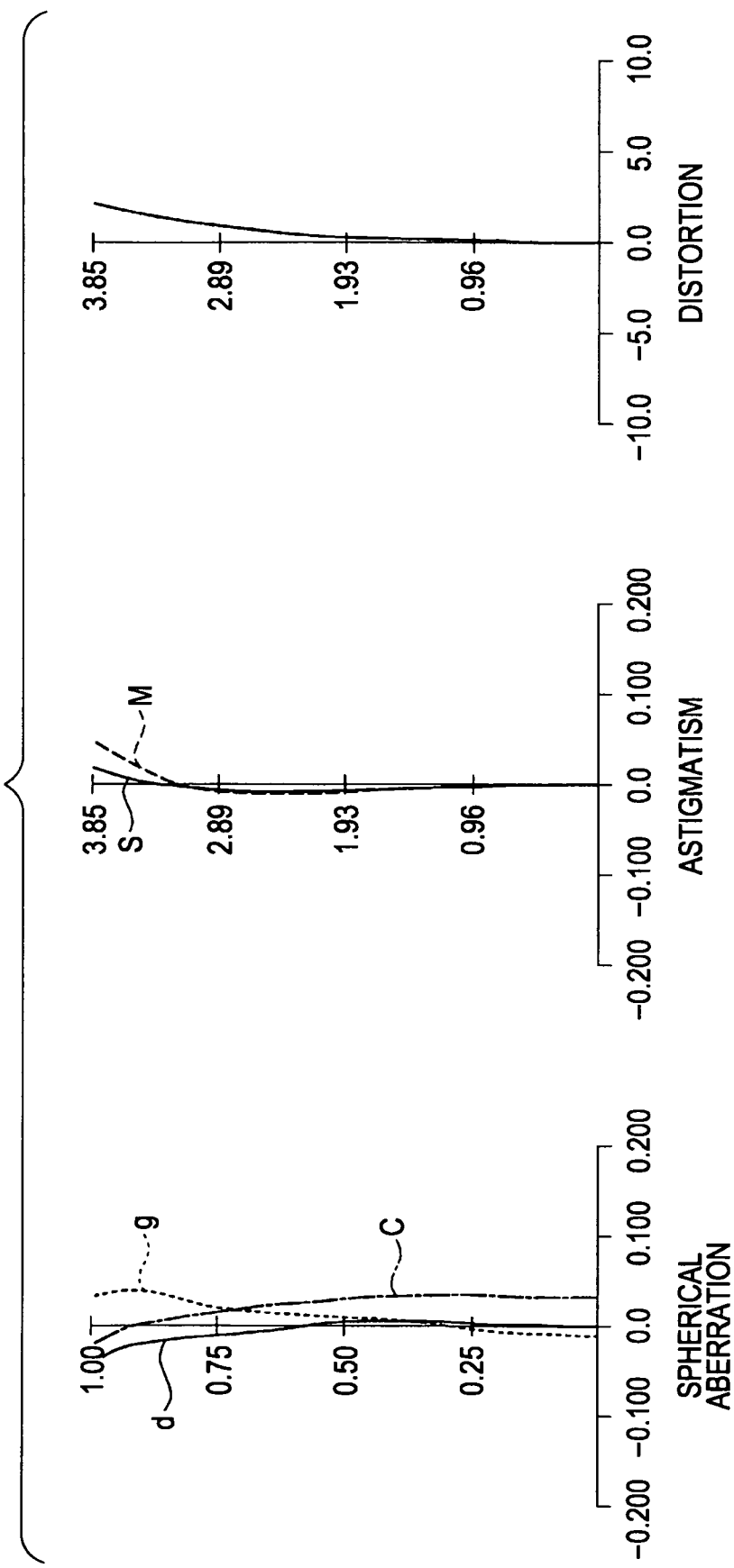
FIG. 7 illustrates characteristic diagrams of spherical aberration, astigmatism, and distortion according to Example 2.
Figure 8:
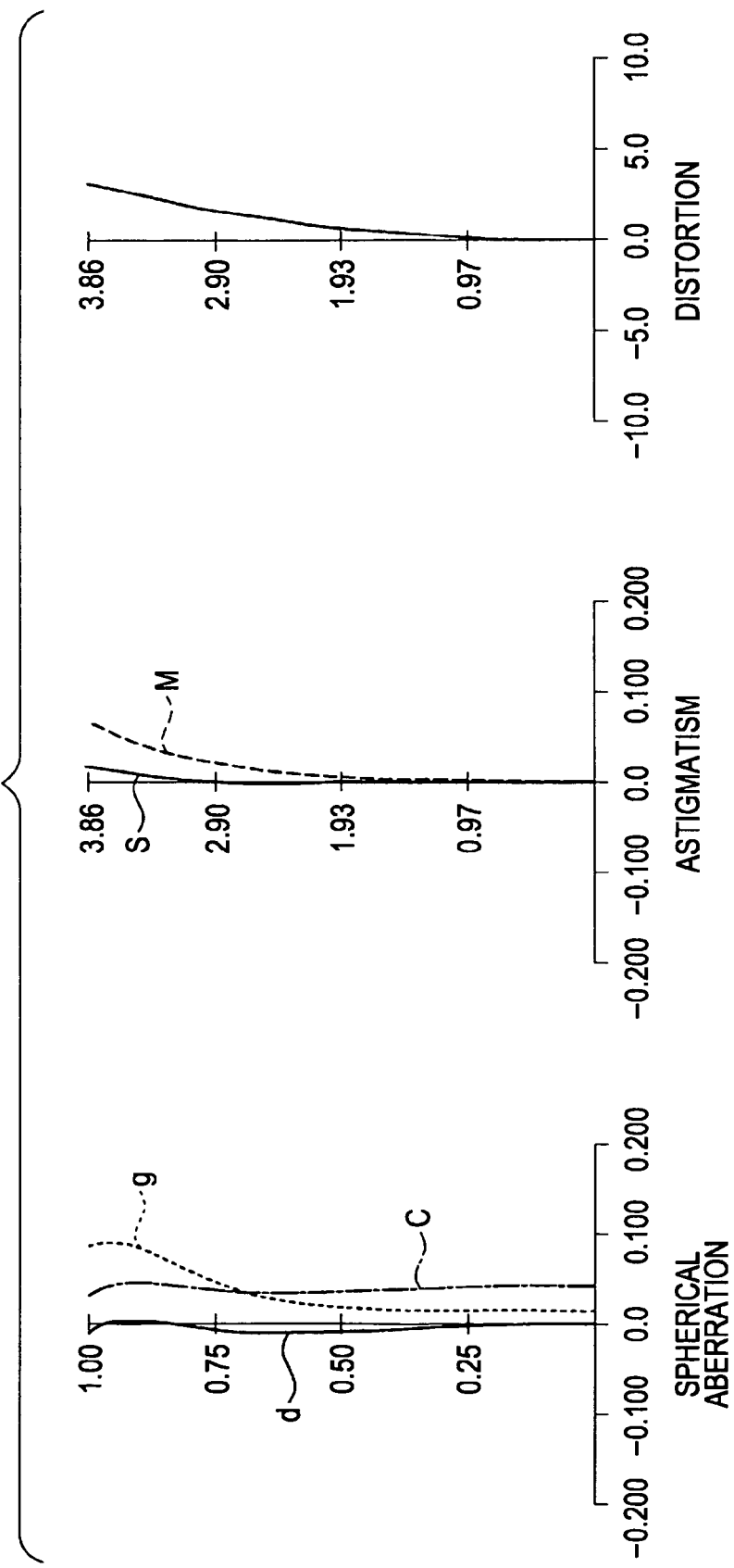
FIG. 8 illustrates characteristic diagrams of spherical aberration, astigmatism, and distortion according to Example 2.

FIGS. 6 to 8 are characteristic diagrams showing spherical aberration, astigmatism, and distortion according to Example 2. In the spherical aberration, the vertical axis plots a ratio to an open F-number, and the horizontal axis plots a defocus. The solid line illustrates the spherical aberration at the d-line, the broken line illustrates the spherical aberration at the g-line, and the dotted-chain line illustrates the spherical aberration at the C-line. In the astigmatism, the vertical axis plots an image height, and the horizontal axis plots a focus. The solid line illustrates a sagittal field curvature S and the broken line illustrates a meridional field curvature M. In the distortion, the vertical axis plots an image height, and the horizontal axis plots the distortion (%).

Third Embodiment

Figure 9:
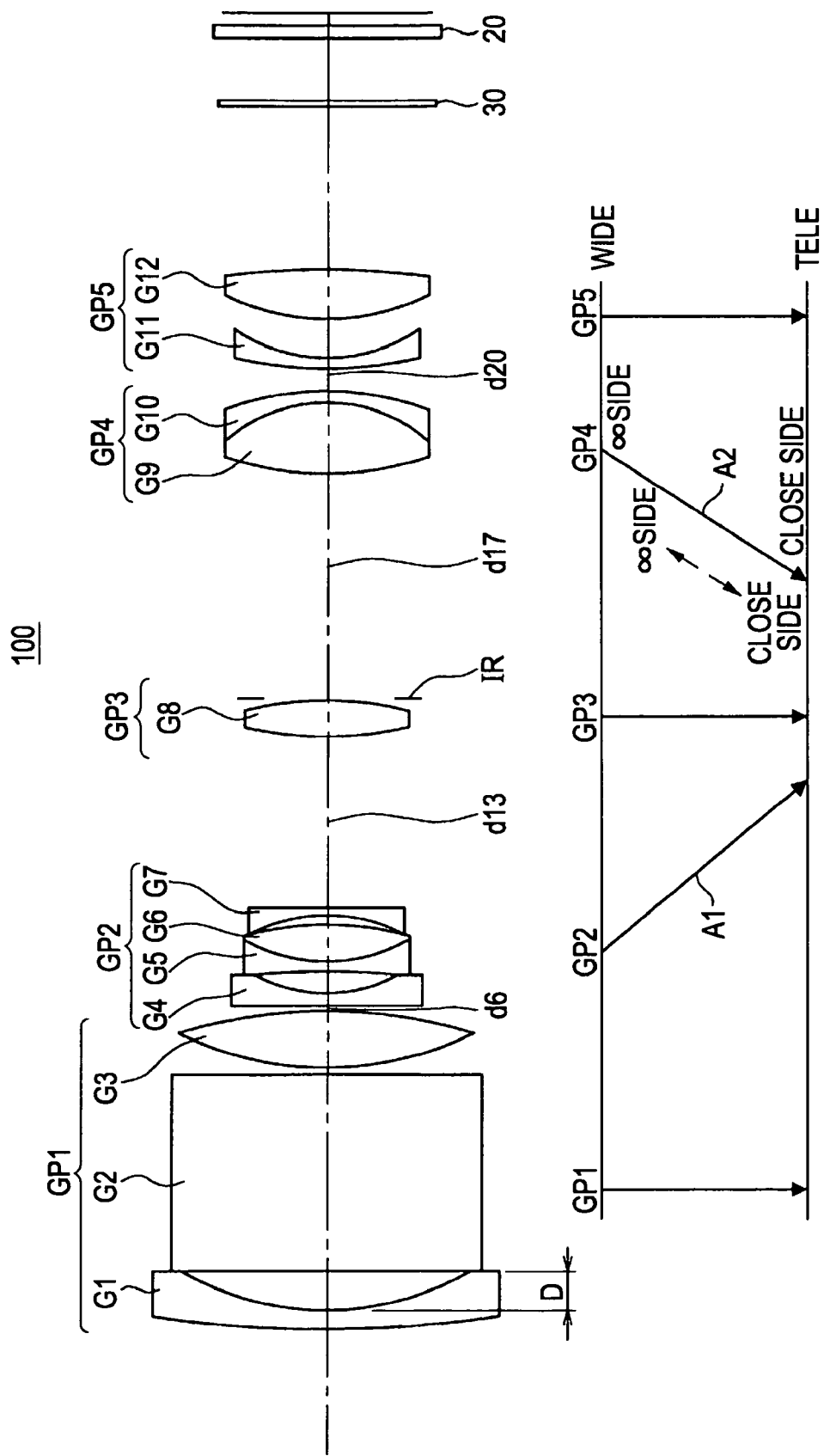
FIG. 9 is a schematic illustration showing a zoom lens according to a third embodiment of the present invention.

FIG. 9 is a schematic illustration showing a zoom lens 100 according to a third embodiment. The zoom lens 100 of the third embodiment includes a first lens group GP1 having a positive refractive power, a second lens group GP2 having a negative refractive power, a third lens group GP3 having a positive refractive power, a fourth lens group GP4 having a positive refractive power, and a fifth lens group GP5 having a negative refractive power, in that order from the object side.

The first lens group GP1 includes a negative lens G1 having an aspherical surface at the image plane side, a right-angle prism G2 for bending the optical axis by 90 degrees, and a positive lens G3 having aspherical surfaces on both surfaces. The second lens group GP2 includes a negative lens G4, a cemented lens of a negative lens G5 and a positive lens G6, and a negative lens G7. The third lens group GP3 includes a positive lens G8 having aspherical surfaces on both surfaces. The fourth lens group GP4 includes a cemented lens of a positive lens G9 and a negative lens G10. The positive lens G9 has an object-side aspherical surface. The fifth lens group GP5 includes a negative lens G11 and a positive lens G12.

When the lens position is changed from the wide-angle end to the telephoto end, the second lens group GP2 and the fourth lens group GP4 are moved in directions indicated by arrows A1 and A2.

Example 3

Table 7 shows numerical values of Example 3 which is a specific configuration of the zoom lens 100 according to the third embodiment.

TABLE 7

| Si | ri | Aspherical surface | di | ni | vi |
|---|---|---|---|---|---|
| 1 | 34.026 | | 0.750 | 1.92286 | 20.9 |
| 2 | 10.619 | | 1.550 | | |
| 3 | INFINITY | | 8.100 | 1.90366 | 42.984 |
| 4 | INFINITY | | 0.200 | | |
| 5 | 11.097 | ASP | 2.178 | 1.69350 | 53.2 |
| 6 | −21.314 | ASP | Variable | | |
| 7 | INFINITY | ASP | 0.600 | 1.85135 | 40.1 |
| 8 | 6.044 | ASP | 0.795 | | |
| 9 | −20.944 | | 0.430 | 1.83400 | 37.3 |
| 10 | 6.271 | | 1.540 | 1.84666 | 23.8 |
| 11 | −12.075 | | 0.290 | | |
| 12 | −6.936 | | 0.430 | 1.80611 | 40.7 |
| 13 | −74.614 | | Variable | | |
| 14 | 13.176 | ASP | 1.401 | 1.58313 | 59.5 |
| 15 | −13.294 | ASP | 0.200 | | |
| 16 | INFINITY | | 1.500 | | |
| 17 | INFINITY | | Variable | | |
| 18 | 13.245 | ASP | 2.772 | 1.58313 | 59.5 |
| 19 | −5.497 | | 0.430 | 1.80610 | 33.3 |
| 20 | −10.568 | | Variable | | |
| 21 | 16.826 | | 0.430 | 2.00069 | 25.5 |
| 22 | 6.093 | | 1.673 | | |
| 23 | 9.250 | | 1.878 | 1.48749 | 70.4 |
| 24 | −94.034 | | 6.673 | | |
| 25 | INFINITY | | 0.800 | 1.51680 | 64.2 |
| 26 | INFINITY | | 3.000 | | |

In the zoom lens according to the third embodiment, when the focal position is changed, an axial surface distance (air distance) d6 between the first lens group GP1 and the second lens group GP2, an axial surface distance (air distance) d13 between the second lens group GP2 and the third lens group GP3, an axial surface distance (air distance) d16 between an aperture stop IR and the fourth lens group GP4, and an axial surface distance (air distance) d19 between the fourth lens group GP4 and the fifth lens group GP5, are variable. Table 8 shows axial surface distances (air distances) at the wide-angle end, the intermediate focal position, and the telephoto end, together with F-numbers FNO and half view angles ω. Reference character f represents focal lengths of the whole lens system.

TABLE 8

| f | 6.206 | 10.656 | 23.033 |
|---|---|---|---|
| Fno | 3.66 | 3.83 | 4.73 |
| ω | 33.105 | 19.558 | 9.233 |
| d6 | 0.400 | 3.800 | 6.854 |
| d13 | 6.854 | 3.454 | 0.400 |
| d17 | 7.660 | 4.880 | 0.615 |
| d20 | 1.066 | 3.845 | 8.111 |

In the third embodiment, an image-side surface s2 of the first lens G1, both surfaces s5 and s6 of the second lens G3, both surfaces s7 and s8 of the third lens G4, both surfaces s14 and s15 of the seventh lens G8, and an object-side surface s17 of the eighth lens G9 are aspherical. Table 9 shows conic constants K of the surfaces and aspherical coefficients A, B, C, and D of the 4th, 6th, 8th, and 10th orders according to Example 3.

TABLE 9

| si | K | A | B | C | D |
|---|---|---|---|---|---|
| 5 | −0.037 | −1.198E−04 | 8.274E−08 | 3.048E−08 | −3.256E−09 |
| 6 | 0.767 | 1.587E−05 | 1.371E−06 | −2.358E−08 | −2.035E−09 |
| 7 | 0.000 | 8.492E−05 | −2.293E−06 | 6.614E−07 | −1.816E−08 |
| 8 | 0.000 | −3.211E−04 | −4.123E−07 | −5.470E−07 | 1.402E−07 |
| 14 | −1.864 | −9.157E−05 | 1.751E−06 | 3.719E−07 | 6.864E−09 |
| 15 | −1.060 | 6.838E−05 | 2.363E−06 | 1.449E−07 | 1.596E−08 |
| 18 | 0.000 | −1.029E−04 | 6.784E−06 | −4.228E−07 | 2.385E−08 |

Figure 10:
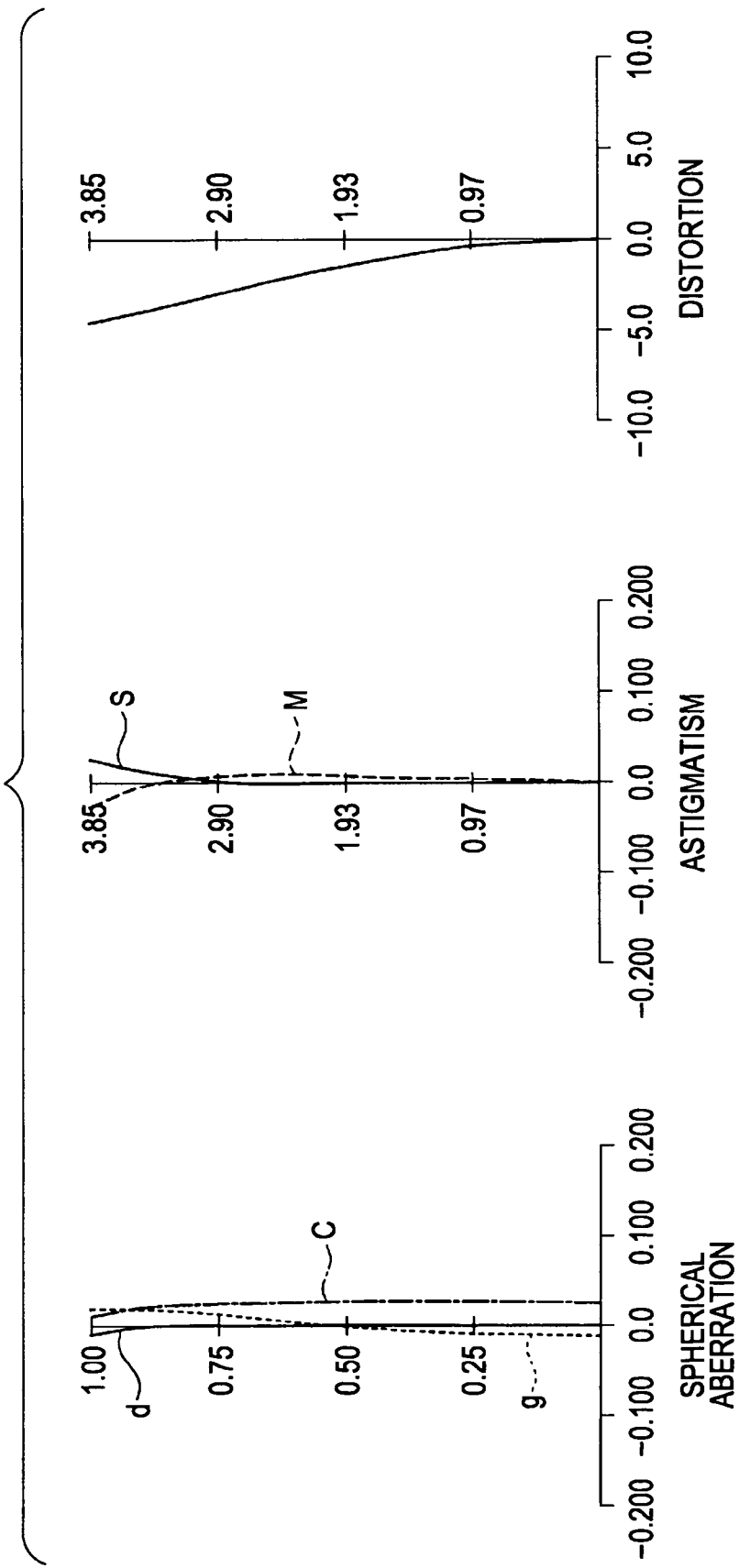
FIG. 10 illustrates characteristic diagrams of spherical aberration, astigmatism, and distortion according to Example 3.
Figure 11:
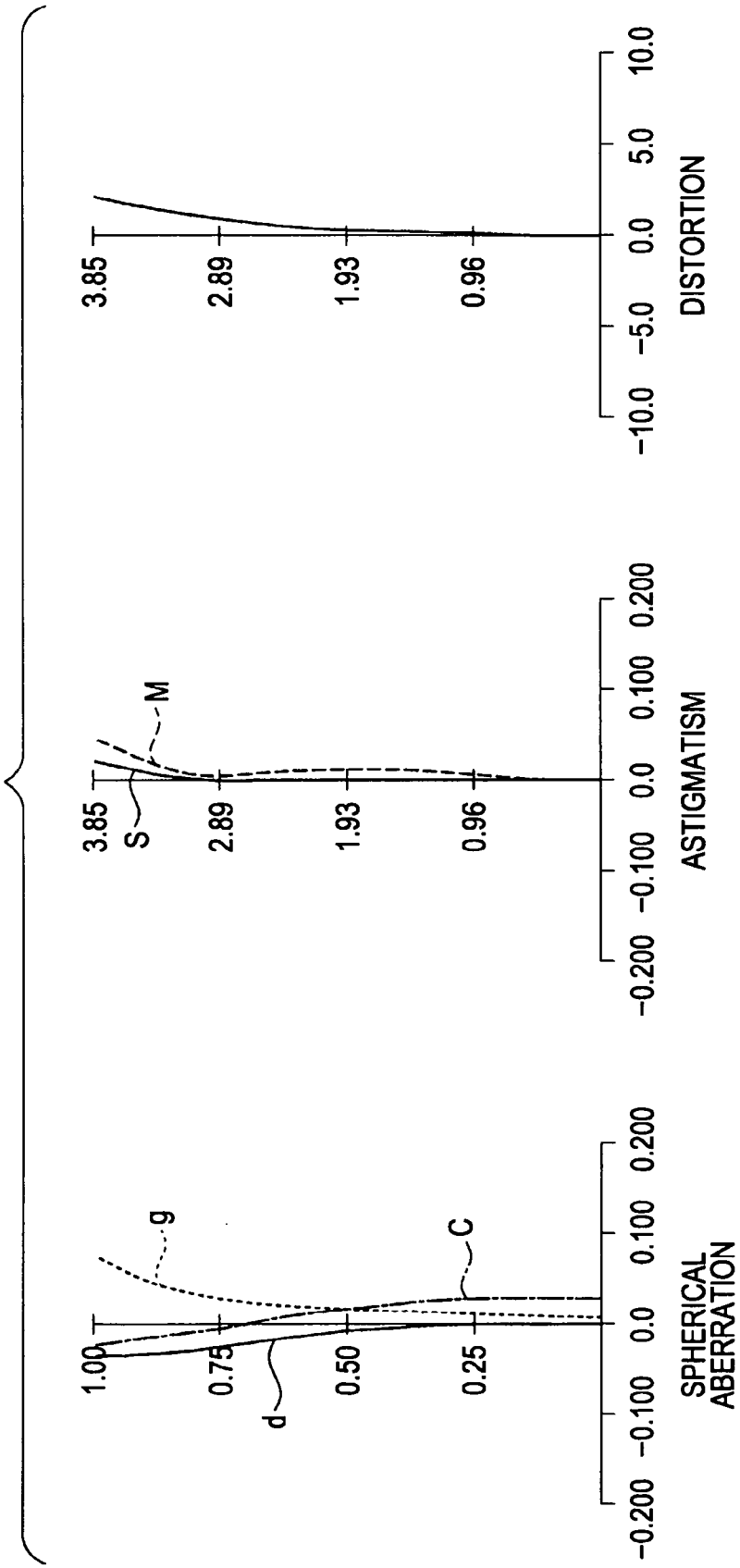
FIG. 11 illustrates characteristic diagrams of spherical aberration, astigmatism, and distortion according to Example 3.
Figure 12:
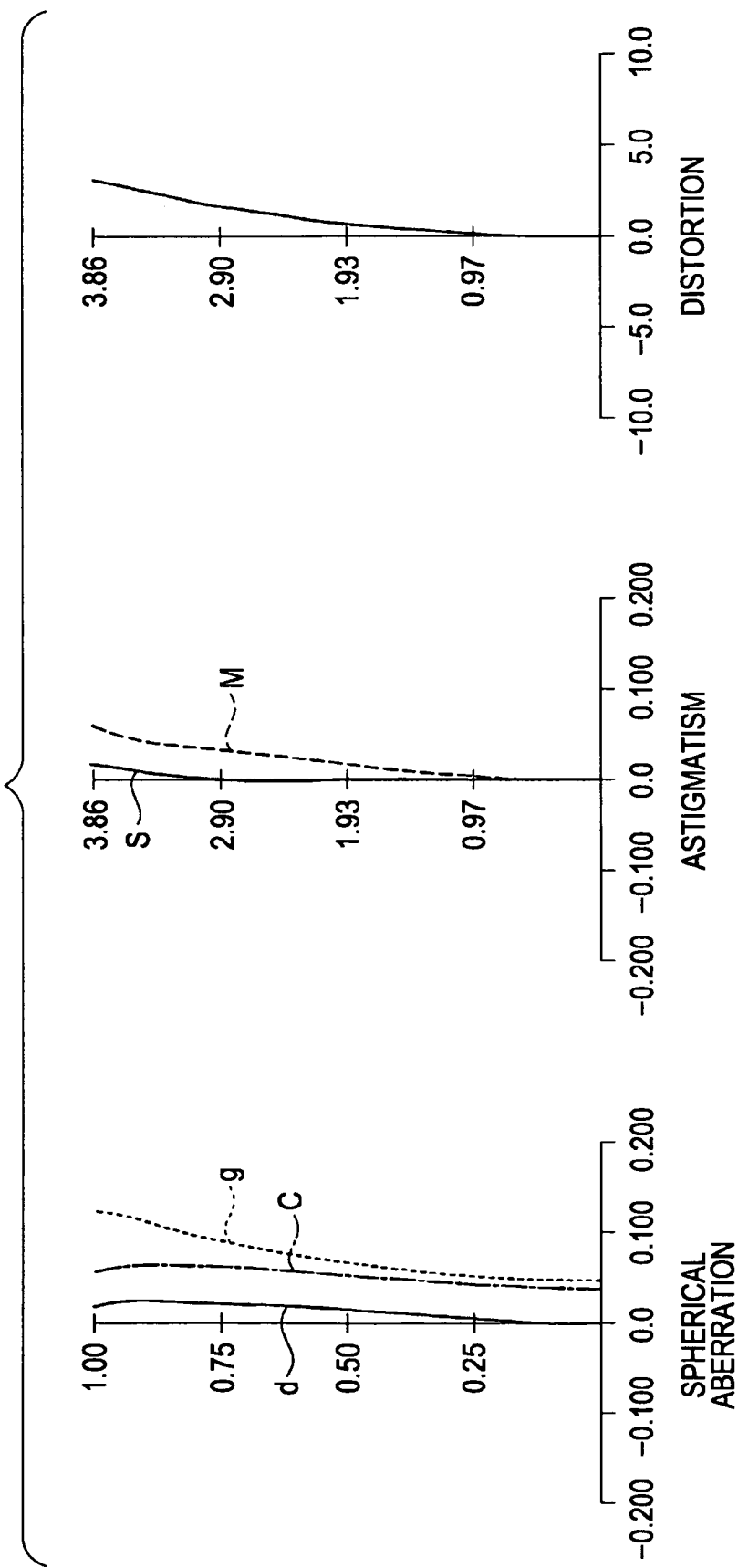
FIG. 12 illustrates characteristic diagrams of spherical aberration, astigmatism, and distortion according to Example 3.

FIGS. 10 to 12 are characteristic diagrams showing spherical aberration, astigmatism, and distortion according to Example 3. In the spherical aberration, the vertical axis plots a ratio to an open F-number, and the horizontal axis plots a defocus. The solid line illustrates the spherical aberration at the d-line, the broken line illustrates the spherical aberration at the g-line, and the dotted-chain line illustrates the spherical aberration at the C-line. In the astigmatism, the vertical axis plots an image height, and the horizontal axis plots a focus. The solid line illustrates a sagittal field curvature S and the broken line illustrates a meridional field curvature M. In the distortion, the vertical axis plots an image height, and the horizontal axis plots the distortion (%).

Fourth Embodiment

Figure 13:
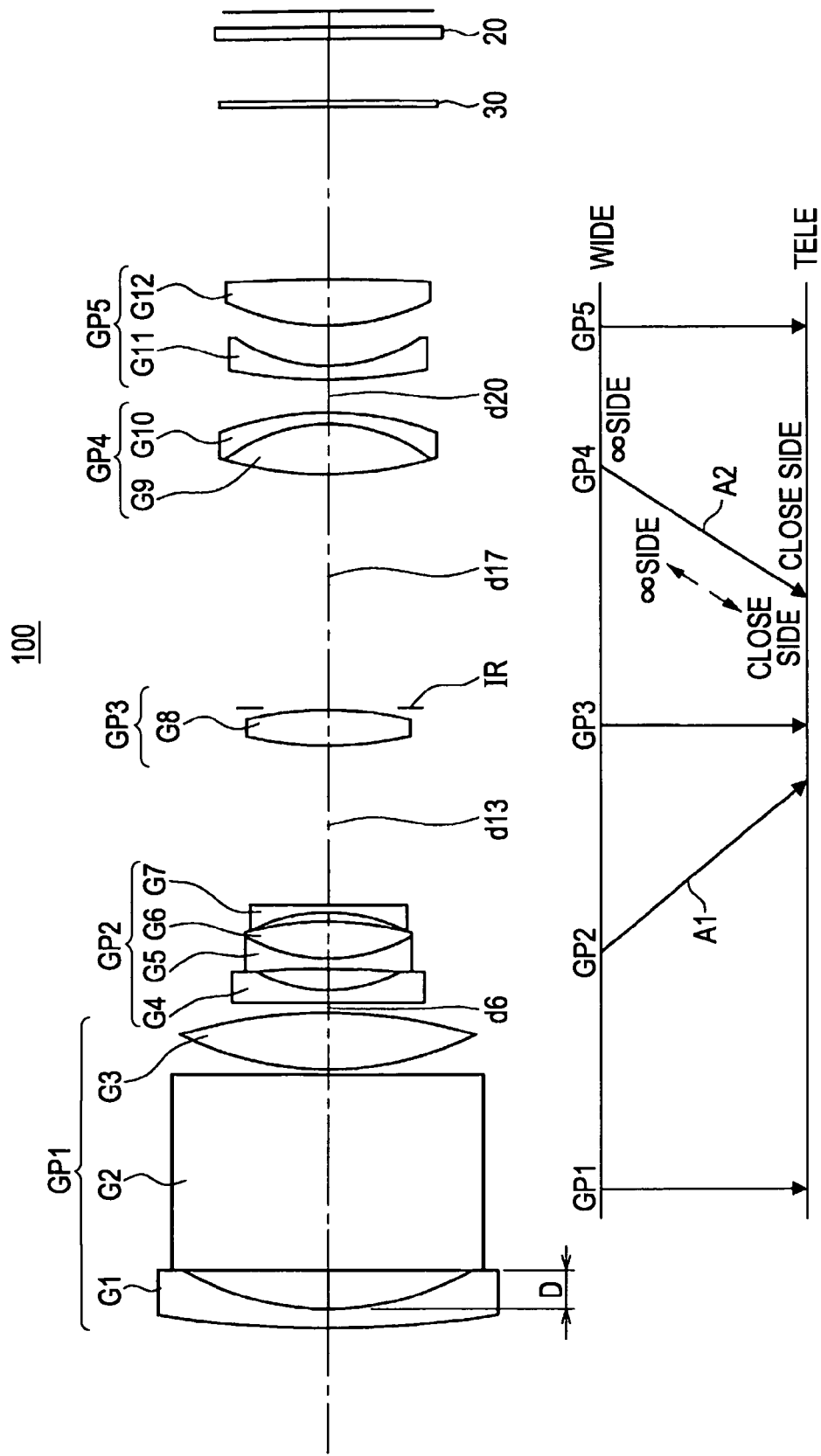
FIG. 13 is a schematic illustration showing a zoom lens according to a fourth embodiment of the present invention.

FIG. 13 is a schematic illustration showing a zoom lens 100 according to a fourth embodiment. The zoom lens 100 of the fourth embodiment includes a first lens group GP1 having a positive refractive power, a second lens group GP2 having a negative refractive power, a third lens group GP3 having a positive refractive power, a fourth lens group GP4 having a positive refractive power, and a fifth lens group GP5 having a negative refractive power, in that order from the object side.

The first lens group GP1 includes a negative lens G1 having an aspherical surface at the image plane side, a right-angle prism G2 for bending the optical axis by 90 degrees, and a positive lens G3 having aspherical surfaces on both surfaces. The second lens group GP2 includes a negative lens G4, a cemented lens of a negative lens G5 and a positive lens G6, and a negative lens G7. The third lens group GP3 includes a positive lens G8 having aspherical surfaces on both surfaces. The fourth lens group GP4 includes a cemented lens of a positive lens G9 and a negative lens G10. The positive lens G9 has an object-side aspherical surface. The fifth lens group GP5 includes a negative lens G11 and a positive lens G12.

When the lens position is changed from the wide-angle end to the telephoto end, the second lens group GP2 and the fourth lens group GP4 are moved in directions indicated by arrows A1 and A2.

Example 4

Table 10 shows numerical values of Example 4 which is a specific configuration of the zoom lens 100 according to the fourth embodiment.

TABLE 10

| Si | ri | Aspherical surface | di | ni | vi |
|---|---|---|---|---|---|
| 1 | 34.215 | | 0.600 | 1.92286 | 20.9 |
| 2 | 10.751 | | 1.550 | | |
| 3 | INFINITY | | 7.900 | 1.90366 | 42.984 |
| 4 | INFINITY | | 0.200 | | |
| 5 | 10.682 | ASP | 2.207 | 1.69350 | 53.2 |
| 6 | −21.178 | ASP | Variable | | |
| 7 | −60.002 | ASP | 0.600 | 1.85135 | 40.1 |
| 8 | 6.250 | ASP | 0.709 | | |
| 9 | −74.839 | | 0.430 | 1.88300 | 40.8 |

TABLE 10-continued

| Si | ri | Aspherical surface | di | ni | vi |
|---|---|---|---|---|---|
| 10 | 7.153 | | 1.463 | 1.84666 | 23.8 |
| 11 | −12.180 | | 0.296 | | |
| 12 | −6.724 | | 0.430 | 1.88300 | 40.8 |
| 13 | −216.455 | | Variable | | |
| 14 | 13.020 | ASP | 1.399 | 1.58313 | 59.5 |
| 15 | −12.311 | ASP | 0.200 | | |
| 16 | INFINITY | | 1.500 | | |
| 17 | INFINITY | | Variable | | |
| 18 | 12.511 | ASP | 1.993 | 1.58313 | 59.5 |
| 19 | −6.573 | | 0.430 | 1.71736 | 29.5 |
| 20 | −12.457 | | Variable | | |
| 21 | 16.782 | | 0.430 | 2.00069 | 25.5 |
| 22 | 5.958 | | 1.700 | | |
| 23 | 9.153 | | 1.801 | 1.48749 | 70.4 |
| 24 | −205.292 | | 6.769 | | |
| 25 | INFINITY | | 0.800 | 1.51680 | 64.2 |
| 26 | INFINITY | | 3.000 | | |

In the zoom lens according to the fourth embodiment, when the focal position is changed, an axial surface distance (air distance) d6 between the first lens group GP1 and the second lens group GP2, an axial surface distance (air distance) d13 between the second lens group GP2 and the third lens group GP3, an axial surface distance (air distance) d16 between an aperture stop IR and the fourth lens group GP4, and an axial surface distance (air distance) d19 between the fourth lens group GP4 and the fifth lens group GP5, are variable. Table 11 shows axial surface distances (air distances) at the wide-angle end, the intermediate focal position, and the telephoto end, together with F-numbers FNO and half view angles ω. Reference character f represents focal lengths of the whole lens system.

TABLE 11

| f | 6.452 | 11.095 | 23.998 |
|---|---|---|---|
| Fno | 3.66 | 3.86 | 4.87 |
| ω | 32.161 | 18.913 | 8.876 |
| d6 | 0.500 | 3.637 | 6.383 |
| d13 | 6.283 | 3.146 | 0.400 |
| d17 | 7.710 | 4.976 | 0.692 |
| d20 | 1.410 | 4.144 | 8.428 |

In the fourth embodiment, both surfaces s5 and s6 of the second lens G3, both surfaces s7 and s8 of the third lens G4, both surfaces s14 and s15 of the seventh lens G8, and an object-side surface s17 of the eighth lens G9 are aspherical. Table 12 shows conic constants K of the surfaces and aspherical coefficients A, B, C, and D of the 4th, 6th, 8th, and 10th orders according to Example 4.

TABLE 12

| si | K | A | B | C | D |
|---|---|---|---|---|---|
| 5 | −0.357 | −8.699E−05 | 8.149E−07 | −1.599E−08 | −1.437E−09 |
| 6 | −0.393 | 1.591E−05 | 2.048E−06 | −8.258E−08 | −5.810E−12 |
| 7 | 0.000 | −4.497E−04 | 9.678E−05 | −6.634E−06 | 2.153E−07 |
| 8 | 0.000 | −1.143E−03 | 9.652E−05 | −5.147E−06 | 2.086E−07 |
| 14 | −1.561 | −1.100E−04 | 2.478E−05 | −3.208E−07 | 1.441E−07 |
| 15 | −1.391 | 7.858E−05 | 2.437E−05 | −4.808E−07 | 1.554E−07 |
| 18 | 0.000 | −1.908E−04 | 4.399E−06 | −4.306E−07 | 1.996E−08 |

Figure 14:
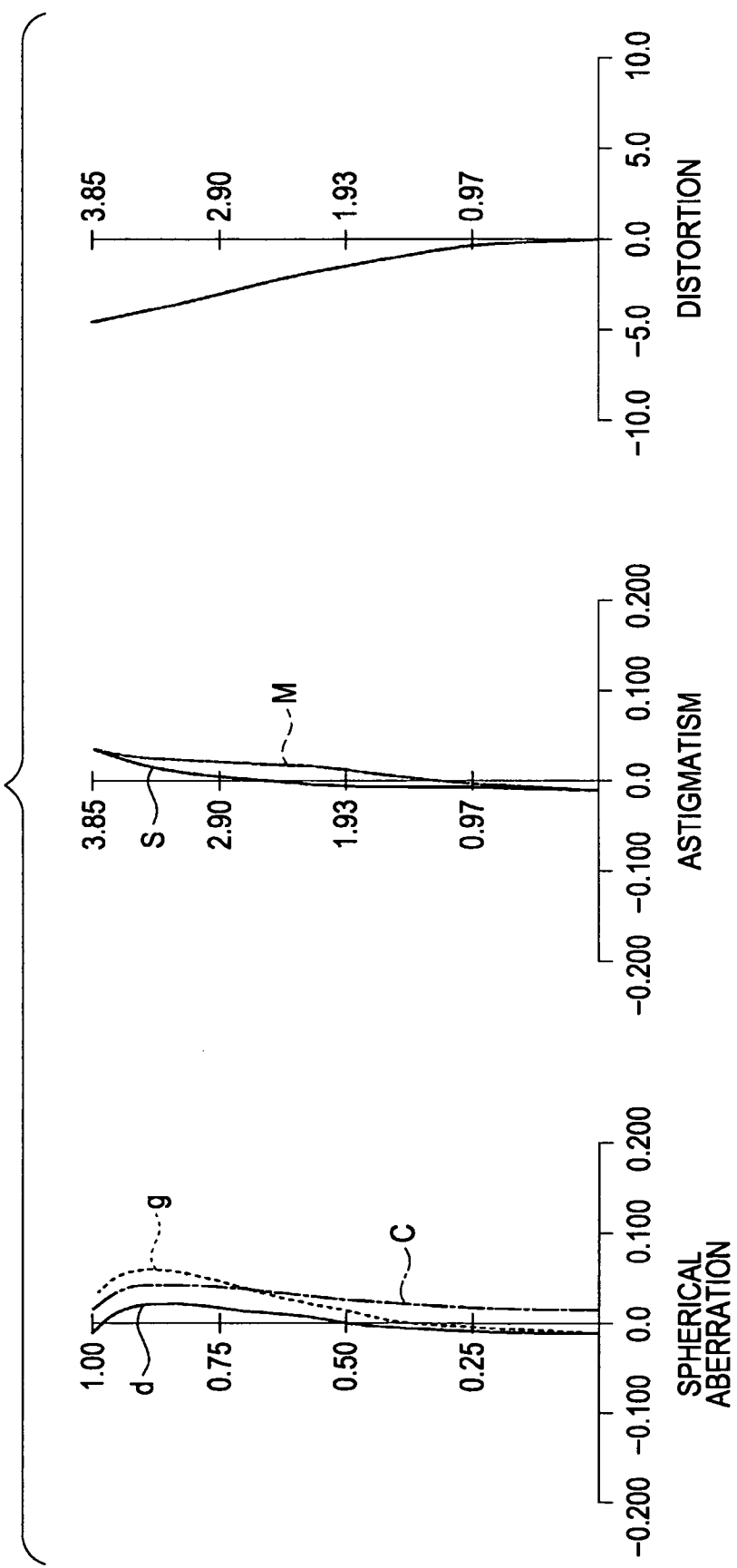
FIG. 14 illustrates characteristic diagrams of spherical aberration, astigmatism, and distortion according to Example 4.
Figure 15:
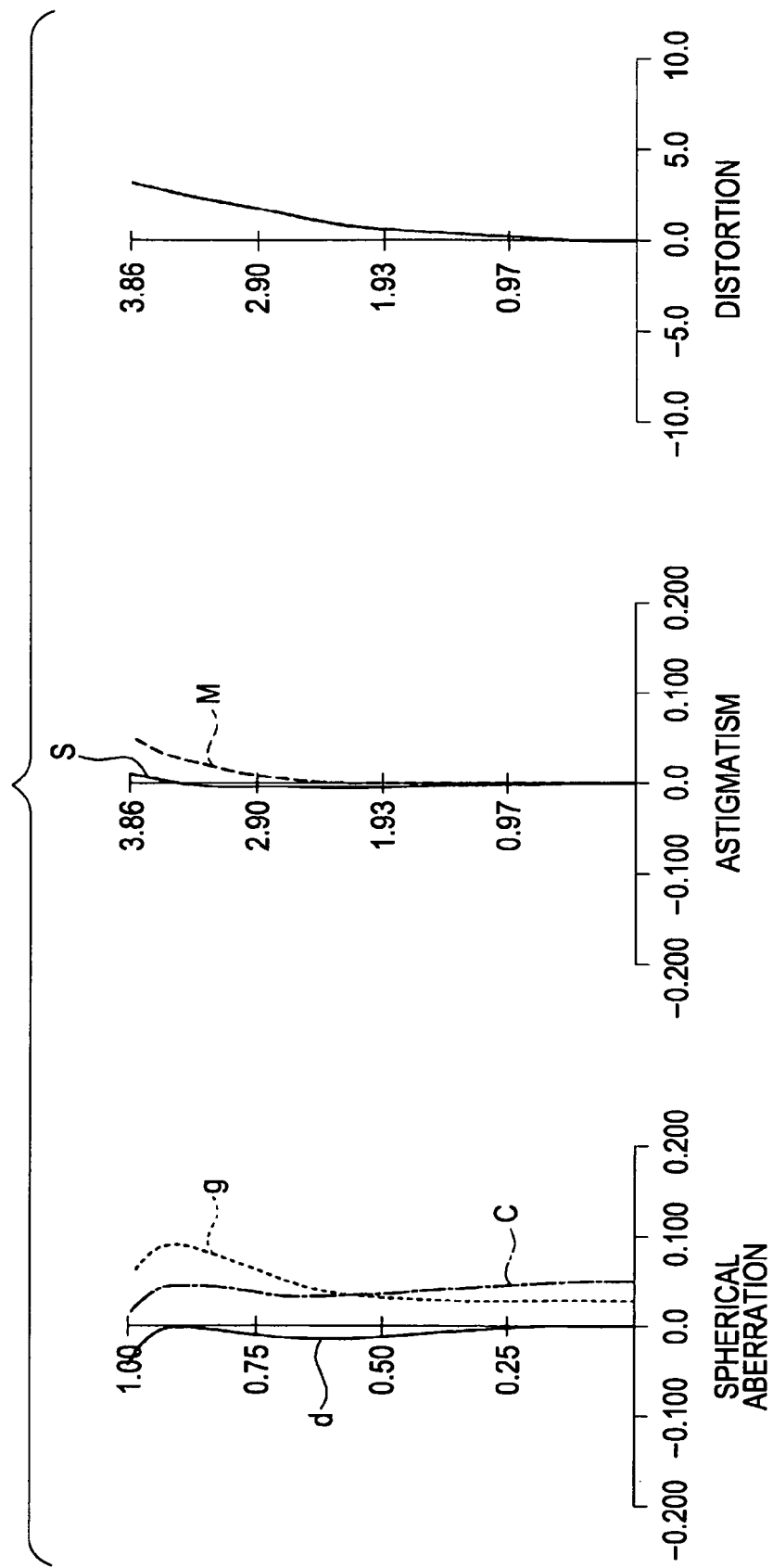
FIG. 15 illustrates characteristic diagrams of spherical aberration, astigmatism, and distortion according to Example 4.
Figure 16:
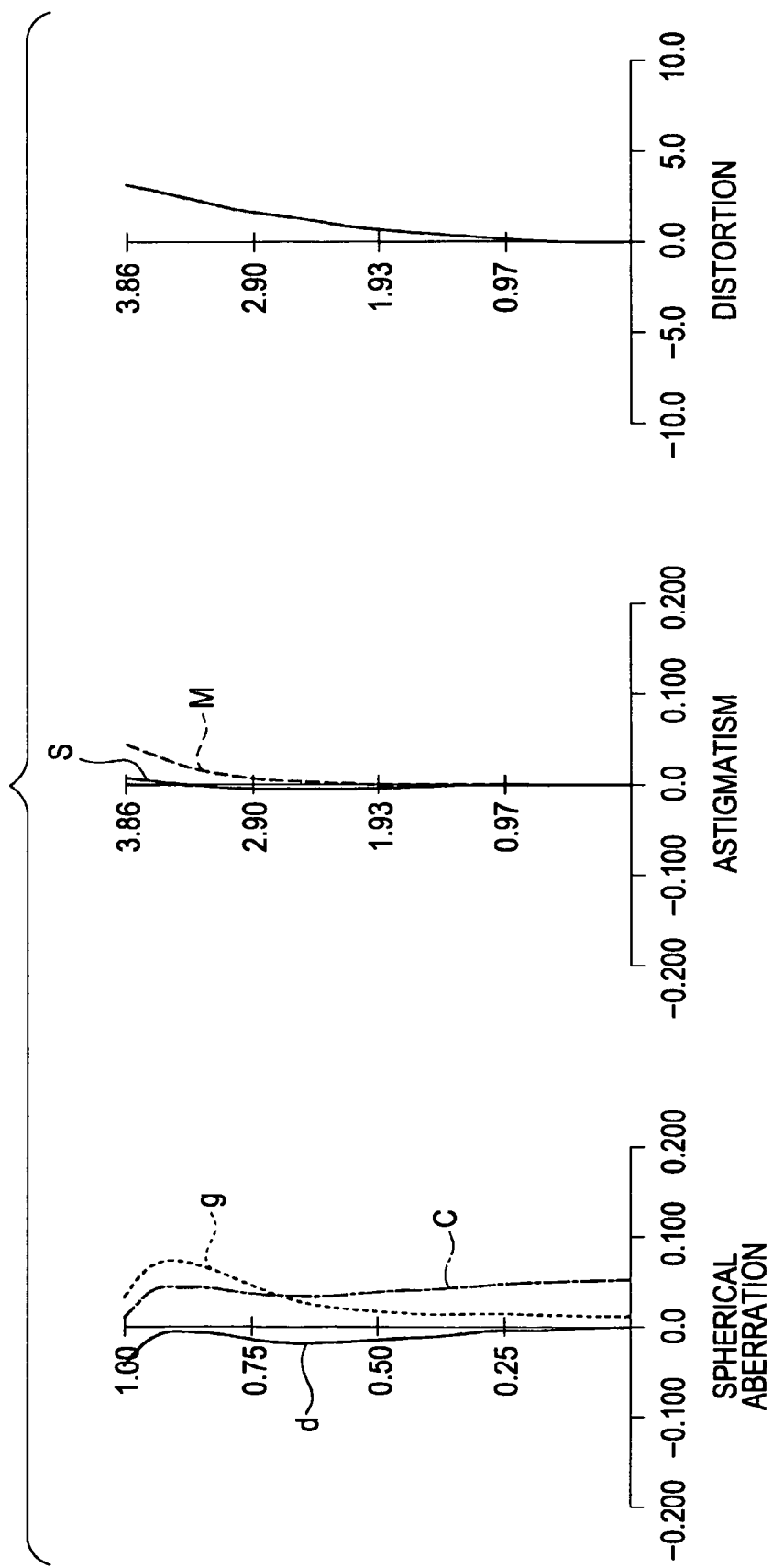
FIG. 16 illustrates characteristic diagrams of spherical aberration, astigmatism, and distortion according to Example 4.

FIGS. 14 to 16 are characteristic diagrams showing spherical aberration, astigmatism, and distortion according to Example 4. In the spherical aberration, the vertical axis plots a ratio to an open F-number, and the horizontal axis plots a defocus. The solid line illustrates the spherical aberration at the d-line, the broken line illustrates the spherical aberration at the g-line, and the dotted-chain line illustrates the spherical aberration at the C-line. In the astigmatism, the vertical axis plots an image height, and the horizontal axis plots a focus. The solid line illustrates a sagittal field curvature S and the broken line illustrates a meridional field curvature M. In the distortion, the vertical axis plots an image height, and the horizontal axis plots the distortion (%).

Table 13 shows values of |fGP2/fw|, |fG1/fG2|, NdL1, VdL1, and NdP of Conditional Expressions (1) to (5) for Examples 1 to 4 of the above-described respective embodiments.

TABLE 13

| Embodiment | |fGP2/fw| | |fG1/fG2| | NdL1 | VdL1 | NdP |
|---|---|---|---|---|---|
| 1 | 0.68 | 1.51 | 1.92286 | 20.9 | 1.90366 |
| 2 | 0.69 | 1.67 | 1.92286 | 20.9 | 1.90366 |
| 3 | 0.70 | 1.56 | 1.92286 | 20.9 | 1.90366 |
| 4 | 0.63 | 1.62 | 1.92286 | 20.9 | 1.90366 |

As described above, with Examples 1 to 4 of the respective embodiments with reference to the above-described tables and aberration diagrams, the compact and high magnification zoom lens 100 is provided while the various aberration is corrected in a balanced manner.

Next, an image pickup apparatus 200 according to an embodiment of the present invention is described. FIG. 17 is a schematic illustration showing the configuration of the image pickup apparatus 200. The image pickup apparatus 200 includes the zoom lens 100 according to any of the above-described embodiments, and the image pickup device 20 that converts an optical image formed on the image pickup surface by the zoom lens 100 into an electric signal. The image pickup device 20 may use, for example, a photoelectric conversion element, such as a charge coupled device (CCD) or a complementary metal-oxide semiconductor (CMOS).

The electric signal formed by the image pickup device 20 is input to an image separator circuit 22. A focus control signal is separated from the electric signal by the image separator circuit 22. The focus control signal is output to a control circuit (CPU) 10. An image signal is output from the image separator circuit 22 to an image processor circuit 24. The signal output to the image processor circuit 24 is processed into a state suitable for the subsequent process. The processed signal is used for displaying on a display unit, recording onto a recording medium, and transferring by a communication unit, and the like.

The control circuit 10 receives an operation signal from the outside, such as operation of a zoom button. Various processing is performed in accordance with the operation signal. For example, when a zooming instruction is input from a zoom button, to achieve a focal length on the basis of the instruction, driving motors 14 and 18 are operated via driver circuits 12 and 16 to move the second lens group GP2 and the fourth lens group GP4 to predetermined positions.

Position information of the second lens group GP2 and position information of the fourth lens group GP4 are obtained by sensors 26 and 28, and are input to the control circuit 10. On the basis of the position information input from the sensors 26 and 28, the control circuit 10 outputs instruction signals for driving the driving motors 14 and 18 to the driver circuits 12 and 16. The control circuit 10 detects a focused state (in-focus state) on the basis of the signal output from the image separator circuit 22. The control circuit 10 controls the position of the fourth lens group GP4 to a position so that an optimally focused state can be obtained via the driver circuit 7.

When the image pickup apparatus 200 uses the zoom lens 100 according to any of the above-described respective embodiments, the image pickup apparatus 200 can be reduced in size and thickness, and image capturing with high magnification can be performed. Specific products of the image pickup apparatus 200 may be products in various forms. For example, the image pickup apparatus 200 may be applied to a digital still camera, a digital video camera, or a camera section of a digital input/output apparatus such as a personal digital assistant (PDA) with a camera, or a mobile phone with a camera.

The present application contains subject matter related to that disclosed in Japanese Priority Patent Application JP 2008-075927 filed in the Japan Patent Office on Mar. 24, 2008, the entire content of which is hereby incorporated by reference.

While the preferred embodiments of the present invention have been described above with reference to the attached drawings, the present invention is not limited to the embodiments. It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising:
   a first lens group including a first lens, a right-angle prism, and a second lens in that order from the object side, the first lens being a single lens having a negative refractive power, the right-angle prism bending an optical path, the second lens including at least a lens having a positive refractive power, the first lens group having a positive refractive power;
   a second lens group arranged at the image plane side of the first lens group and including a third lens, a fourth lens, a fifth lens, and a sixth lens in that order from the object side, the third lens including an aspherical surface and having a negative refractive power, the fourth lens having a negative refractive power, the fifth lens having a positive refractive power, the sixth lens having a negative refractive power, the second lens group having a negative refractive power, the second lens group being moved in an optical-axis direction during zooming;
   a third lens group arranged at the image plane side of the second lens group, the third lens group having a positive refractive power; and
   a fourth lens group arranged at the image plane side of the third lens group, the fourth lens group having a positive refractive power, the fourth lens group being moved in the optical-axis direction during zooming.

2. The zoom lens according to claim 1, wherein Conditional Expression (1) is satisfied as follows $$0.62 < fGP2/fw < 0.7 \quad (1)$$

where fGP2 is a focal length of the second lens group, and fw is a focal length of a whole system of the zoom lens at the wide-angle end, in Conditional Expression (1).

3. The zoom lens according to claim 1, wherein Conditional Expression (2) is satisfied as follows $$1.5 < |fG1/fG2| < 1.7 \quad (2)$$

where fG1 is a focal length of the first lens, and fG2 is a focal length of the second lens, in Conditional Expression (2).

4. The zoom lens according to claim 1, wherein Conditional Expression (3) is satisfied as follows $$NdL1 > 1.75 \quad (3)$$

where NdL1 is a refractive index of the first lens at the d-line, in Conditional Expression (3).

5. The zoom lens according to claim 1, wherein Conditional Expression (4) is satisfied as follows $$VdL1 < 35 \quad (4)$$

where VdL1 is an Abbe number of the first lens at the d-line, in Conditional Expression (4).

6. The zoom lens according to claim 1, wherein Conditional Expression (5) is satisfied as follows $$NdP > 1.80 \quad (5)$$

where NdP is a refractive index of the right-angle prism at the d-line, in Conditional Expression (5).

7. The zoom lens according to claim 1, wherein at least a surface of the second lens is an aspherical surface.

8. An image pickup apparatus comprising:
   a zoom lens including
   a first lens group including a first lens, a right-angle prism, and a second lens in that order from the object side, the first lens being a single lens having a negative refractive power, the right-angle prism bending an optical path, the second lens including at least a lens having a positive refractive power, the first lens group having a positive refractive power,
   a second lens group arranged at the image plane side of the first lens group and including a third lens, a fourth lens, a fifth lens, and a sixth lens in that order from the object side, the third lens including an aspherical surface and having a negative refractive power, the fourth lens having a negative refractive power, the fifth lens having a positive refractive power, the sixth lens having a negative refractive power, the second lens group having a negative refractive power, the second lens group being moved in an optical-axis direction during zooming,
   a third lens group arranged at the image plane side of the second lens group, the third lens group having a positive refractive power, and
   a fourth lens group arranged at the image plane side of the third lens group, the fourth lens group having a positive refractive power, the fourth lens group being moved in the optical-axis direction during zooming; and
   an image pickup device having an image plane on which an object image is formed by the zoom lens.

9. A zoom lens comprising:
   a first lens group including, in order from the object plane side, a first lens, a right-angle prism, and a second lens, the first lens being a single lens having a negative refractive power, the right-angle prism bending an optical path, the second lens having a positive refractive power, the first lens group having a positive refractive power;
   a second lens group arranged at the image plane side of the first lens group and including, in order from the object plane side, a third lens, a fourth lens, a fifth lens, and a sixth lens, the third lens including an aspherical surface and having a negative refractive power, the fourth lens having a negative refractive power, the fifth lens having a positive refractive power, the sixth lens having a negative refractive power, the second lens group configured to be moved in an optical-axis direction during zooming;
   a third lens group arranged at the image plane side of the second lens group, the third lens group having a positive refractive power; and a fourth lens group arranged at the image plane side of the third lens group, the fourth lens group having a positive refractive power, the fourth lens group configured to be moved in the optical-axis direction during zooming.

10. The zoom lens according to claim 9, wherein the second lens is arranged without an intervening lens between the second lens and the right-angle prism.

11. The zoom lens according to claim 9, wherein Conditional Expression (1) is satisfied as follows:

$$0.62 < |fGP2/fw| < 0.7 \qquad (1),$$

where fGP2 is a focal length of the second lens group, and fw is a focal length of a whole system of the zoom lens at the wide-angle end, in Conditional Expression (1).

12. The zoom lens according to claim 9, wherein the second lens is arranged with an axial surface distance of about 0.2 mm between a surface of the right-angle prism.

13. The zoom lens according to claim 9, wherein Conditional Expression (2) is satisfied as follows:

$$1.5 < |fG1/fG2| < 1.7 \qquad (2),$$

where fG1 is a focal length of the first lens, and fG2 is a focal length of the second lens, in Conditional Expression (2).

14. The zoom lens according to claim 11, wherein Conditional Expression (2) is satisfied as follows:

$$1.5 < |fG1/fG2| < 1.7 \qquad (2),$$

where fG1 is a focal length of the first lens, and fG2 is a focal length of the second lens, in Conditional Expression (2).

15. The zoom lens according to claim 9, wherein Conditional Expression (3) is satisfied as follows:

$$NdL1 > 1.75 \qquad (3),$$

where NdL1 is a refractive index of the first lens at the d-line, in Conditional Expression (3).

16. The zoom lens according to claim 9, wherein Conditional Expression (4) is satisfied as follows:

$$VdL1 < 35 \qquad (4),$$

where VdL1 is an Abbe number of the first lens at the d-line, in Conditional Expression (4).

17. The zoom lens according to claim 9, wherein Conditional Expression (5) is satisfied as follows:

$$NdP > 1.80 \qquad (5),$$

where NdP is a refractive index of the right-angle prism at the d-line, in Conditional Expression (5).

18. An image pickup apparatus comprising:
the zoom lens according to claim 9; and
an image pickup device having an image plane on which an object image is formed by the zoom lens.

19. The zoom lens according to claim 9, further comprising a fifth lens group arranged at the image plane side of the fourth lens group, the fifth lens group having a negative refractive power and including, in order from the object plane side, a tenth lens and an eleventh lens, the tenth lens having a negative refractive power and the eleventh lens having a positive refractive power.

20. The zoom lens according to claim 9, wherein the right-angle prism has a refractive power.

* * * * *